US007948830B2

(12) United States Patent
Suzuki et al.

(10) Patent No.: US 7,948,830 B2
(45) Date of Patent: May 24, 2011

(54) ELECTRONIC DEVICE AND DISPLAY CONTROL METHOD

(75) Inventors: Noritoshi Suzuki, Asaka (JP); Takashi Ihara, Nishitokyo (JP)

(73) Assignee: Citizen Holdings Co., Ltd., Nishitokyo-shi (JP)

( * ) Notice: Subject to any disclaimer, the term of this patent is extended or adjusted under 35 U.S.C. 154(b) by 910 days.

(21) Appl. No.: 11/909,679

(22) PCT Filed: Mar. 20, 2006

(86) PCT No.: PCT/JP2006/305490

§ 371 (c)(1), (2), (4) Date: Sep. 25, 2007

(87) PCT Pub. No.: WO2006/103965

PCT Pub. Date: Oct. 5, 2006

(65) Prior Publication Data

US 2009/0015514 A1 Jan. 15, 2009

(30) Foreign Application Priority Data

Mar. 25, 2005 (JP) ................................ 2005-090029

(51) Int. Cl.
*G04B 47/06* (2006.01)
*G04B 19/04* (2006.01)
*G04C 19/00* (2006.01)
*G01F 23/00* (2006.01)

(52) U.S. Cl. .............. 368/11; 368/80; 368/82; 368/223; 73/290 R; 73/753

(58) Field of Classification Search .................... 368/10, 368/11, 71, 80, 82, 223; 73/290 R, 291, 73/300, 700, 753, 754

See application file for complete search history.

(56) References Cited

U.S. PATENT DOCUMENTS

| | | | | | |
|---|---|---|---|---|---|
| 4,232,510 | A * | 11/1980 | Tamaru et al. | .................. | 368/28 |
| 4,783,772 | A | 11/1988 | Umemoto et al. | | |
| 5,202,858 | A * | 4/1993 | Kanzaki | .......................... | 368/71 |
| 5,519,671 | A | 5/1996 | Murakami et al. | | |
| 5,883,861 | A | 3/1999 | Moser et al. | | |
| 6,167,000 | A * | 12/2000 | Chow | ............................ | 368/107 |
| 6,490,230 | B1 * | 12/2002 | Sakuyama et al. | .............. | 368/11 |
| 2004/0013042 | A1 | 1/2004 | Farine | | |
| 2004/0047242 | A1 | 3/2004 | Germiquet et al. | | |

FOREIGN PATENT DOCUMENTS

| | | | |
|---|---|---|---|
| JP | 313886 | A | 1/1991 |
| JP | 7-294673 | A | 11/1995 |
| JP | 10-316090 | A | 12/1998 |
| WO | WO 94/20886 | | 9/1994 |

* cited by examiner

*Primary Examiner* — Vit W Miska

(74) *Attorney, Agent, or Firm* — Foley & Lardner LLP

(57) ABSTRACT

In an electronic device that includes a first display unit (28) and a second display unit (29) that differs from the first display unit (28) in at least a type, a driving method to perform a display control, and a mode of driving to perform the display control, and that displays a plurality of functions using the first display unit (28) and the second display unit (29), a change request to change from a display in a normal mode (11) to a function mode (13) is acquired, and only a display mode of the second display unit (29) is changed, when the change request is made, to a preparation mode (12) without changing a display mode of the first display unit (28) that is in the normal mode (11) when the display modes of the first display unit (28) and the second display unit (29) are to be changed based on the acquired change request.

22 Claims, 20 Drawing Sheets

ELECTRONIC DEVICE AND DISPLAY CONTROL METHOD

TECHNICAL FIELD

The present invention relates to an electronic device that includes a plurality of types of display units and a display control method of the electronic device.

BACKGROUND ART

In recent years, an electronic device, for example, a dive computer and the like, has come to provide various kinds of information using not only a single display screen but also multiple types of display units. Particularly, not only a liquid crystal display screen but also indicators have come into use to provide various kinds of information (for example, Patent Document 1). Compared to a digital display in which numerals and characters are displayed using a display screen, the analog display using indicators enables intuitive grasp of physical quantity from an image and therefore, enables sure and secure provision of information particularly for an operator during a dive.

Moreover, an electronic device is conventionally known that can be used both on land and underwater by automatically switching between a normal time display mode and a function mode such as a dive mode. For example, an information processing device for divers is disclosed that starts measuring time of a dive when the device submerges deeper than a predetermined water depth (for example, Patent Document 2). Furthermore, an electronic device having a water depth measuring function is disclosed that detects submergence using a water detecting circuit and a water depth measuring circuit, and switches to a dive mode (for example, Patent Document 3).

In these electronic devices, the switching to a function mode such as a dive mode is performed by changing only display contents that are displayed on a digital display screen. Since such a change of display contents displayed on a digital display screen can be instantaneously made, the change to a function mode such as a dive mode with a digital display screen can be done easily.

Patent Document 1: Japanese Patent Application Laid-Open Publication No. H7-294673 (FIG. 1)

Patent Document 2: Japanese Patent Application Laid-Open Publication No. H10-316090 (page 5, FIG. 1)

Patent Document 3: International Application Published under the Patent Cooperation Treaty, Publication No. 94/20886 Pamphlet (page 7, FIG. 2)

DISCLOSURE OF INVENTION

Problem to be Solved by the Invention

In the techniques in the above Patent Documents 1 to 3, however, switching to various kinds of function modes (for example, a dive mode) that involve a display unit that takes time to change the display such as the analog display using indicators or that increases power consumption is not assumed. Therefore, there have been problems in that control of driving a display unit (e.g., indicator) that has a lot of constraints on switching to various kinds of function modes (dive mode) cannot be smoothly performed, and that the display is visually undesirable. In addition, there has been a problem in that if the modes are switched by an error or the like, a lot of power is consumed for the switching, and further, for switching back.

Specifically, for example, if indicators are controlled only by water detection, the indicators must be returned to the normal time display mode (current time display mode, etc.) when it is determined that submergence has not occurred. During such an operation, no information is provided by the indicators, and unnecessary power is consumed for the drive to return the indicators. On the other hand, if the indicators are driven after confirmation of submergence, switching to the dive mode is delayed by the time required to rotate the indicators to predetermined positions, and further, there has been a problem in that rotation of the indicators requires much power compared to a change of the display screen in the case of the digital display.

Originally, not limited to the case of the analog display using indicators, if multiple types of display units are employed, there may be constraints (a required amount of time for a change, etc.) at the time of changing display contents because at least one of the types, the driving method to control the display, and the mode of driving to control the display is different. Therefore, there has been a problem in that the switching of the display contents cannot be smoothly performed.

To solve the problems in the above conventional techniques, it is an object of the present invention to provide an electronic device and a display control method with which various kinds of information can be efficiently provided using a plurality of types of display units at the same time, and automatic switching between a normal time display mode and a function mode can be smoothly and certainly performed.

Means for Solving Problem

To solve the above problems and achieve an object, an electronic device according to the present invention includes a first display unit and a second display unit that differs from the first display unit in at least one of a type, a driving method to perform a display control, and a mode of driving to perform the display control. The electronic device displays a plurality of functions using the first display unit and the second display unit and further includes an acquiring unit that acquires a change request to change a mode of the electronic device from a first display mode in which a first function is displayed to a second display mode in which a second function that is different from the first function is displayed; and a display changing unit that changes from the first display mode to the second display mode, and changes display contents of the first display unit and the second display unit, based on the change request that is acquired by the acquiring unit, wherein the display changing unit changes, when the change request is made, only display contents of the second display unit without changing display contents of the first display unit on which the first function is displayed, and thereafter changes the display contents of the first display unit.

Further, in the electronic device according to the present invention, the display changing unit changes, when the change request is made, the mode of the electronic device to a preparation mode in which only the display contents of the second display unit are changed to a display to inform transition to the second display mode without changing the display contents of the first display unit on which the first function is displayed, and thereafter, changes the display contents of the first display unit.

Moreover, in the electronic device according to the present invention, the display changing unit changes, when the change request is made, the mode of the electronic device to a first preparation mode in which only the display contents of the second display unit are changed to a display to inform transition to the second display mode without changing the display contents of the first display unit on which the first function is displayed, thereafter, changes the display contents of the first display unit, and thereafter, further changes the display contents of the second display unit.

Furthermore, in the electronic device according to the present invention, the display changing unit changes, when the change request is made, the mode of the electronic device to a first preparation mode in which only the display contents of the second display unit are changed to a display to inform transition to the second display mode without changing the display contents of the first display unit on which the first function is displayed, and thereafter, further changes the mode to a second preparation mode in which the display is changed to a display to inform transition of the display contents of the first display unit.

Further, in the electronic device according to the present invention, the acquiring unit is a detecting unit that detects a predetermined condition, and the display changing unit performs switching between the first display mode, the second display mode, the first preparation mode, and the second preparation mode on condition that the predetermined condition is detected by the detecting unit.

Moreover, the electronic device according to the present invention further includes an external operating member, wherein the detecting unit is a detecting unit for an operation of the external operating member.

Furthermore, in the electronic device according to the present invention, the first display unit is slower in a display changing speed than the second display unit.

Further, in the electronic device according to the present invention, the first display unit is greater in power consumption than the second display unit.

Moreover, in the electronic device according to the present invention, the first display unit is configured with one or a plurality of indicators.

Further, in the electronic device according to the present invention, the first display unit includes a light emitting device.

Moreover, in the electronic device according to the present invention, the first display unit displays a plurality of pieces of information in the second display mode.

Furthermore, in the electronic device according to the present invention, the second display unit is configured with a liquid crystal display device.

Further, in the electronic device according to the present invention, the second display unit is configured with one or a plurality of indicators.

Moreover, the electronic device according to the present invention further includes a time measuring unit that measures time; and a function measuring unit that measures physical quantity to realize a function other than time measurement, wherein in the first display mode, a result of measurement by the time measuring unit is displayed, and in the second display mode, a result of measurement by the function measuring unit is displayed.

Further, in the electronic device according to the present invention, the function measuring unit includes a pressure detecting unit and a water depth calculating unit that calculates a water depth from pressure data that is detected by the pressure detecting unit, and in the second display mode, information on the water depth that is calculated by the water depth calculating unit is displayed.

Moreover, in the electronic device according to the present invention, the detecting unit is a water detecting unit that detects water.

Furthermore, in the electronic device according to the present invention, the function measuring unit includes a pressure detecting unit and a water depth calculating unit that calculates a water depth from pressure data that is detected by the pressure detecting unit, and the detecting unit is a water depth detecting unit that detects a predetermined water depth.

Moreover, the electronic device according to the present invention further includes a dive-duration measuring unit that measures dive measuring duration, wherein in the second display mode, a result of measurement by the dive-duration measuring unit is displayed.

Furthermore, the electronic device according to the present invention further includes a pressure detecting unit; and a water depth calculating unit that calculates a water depth from pressure data that is detected by the pressure detecting unit, wherein a maximum dive depth is displayed with an indicator other than an indicator that displays the result of measurement.

Further, in the electronic device according to the present invention, the function measuring unit includes a pressure detecting unit and an altitude calculating unit that calculates an altitude from barometric pressure data that is detected by the pressure detecting unit, and in the second display mode, information on the altitude that is calculated by the altitude calculating unit is displayed.

Moreover, in the electronic device according to the present invention, the function measuring unit includes a magnetism detecting unit and a direction calculating unit that calculates a direction from magnetism data that is detected by the magnetism detecting unit, and in the second function mode, information on the direction that is calculated by the direction calculating unit is displayed.

Furthermore, in the electronic device according to the present invention, the detecting unit performs at least one of detection of a predetermined altitude, detection of execution of altitude calibration, and detection of horizontality.

Further, a display control method of an electronic device that includes a first display unit and a second display unit that differs from the first display unit in at least one of a type, a driving method to perform a display control, and a mode of driving to perform the display control, and that displays a plurality of functions using the first display unit and the second display unit, the display control method includes an acquiring step of acquiring a change request to change a mode of the electronic device from a first display mode in which a first function is displayed to a second display mode in which a second function that is different from the first function is displayed; and a display changing step of changing from the first display mode to the second display mode, and of changing display contents of the first display unit and the second display unit, based on the change request that is acquired at the acquiring step, wherein the display changing step includes changing, when the change request is made, only display contents of the second display unit without changing display contents of the first display unit on which the first function is displayed, and thereafter changing the display contents of the first display unit.

Effect of the Invention

According to the present invention, an electronic device and a display control method by which various kinds of information can be efficiently provided using various types of display units at the same time, and automatic switching between a normal time display mode and a function mode can be smoothly and certainly performed.

BRIEF DESCRIPTION OF DRAWINGS

FIG. 1-2 is an explanatory diagram illustrating an outline of the present invention;

FIG. 2 is an explanatory diagram illustrating a system configuration of the present invention;

EXPLANATIONS OF LETTERS OR NUMERALS

Figure 1:
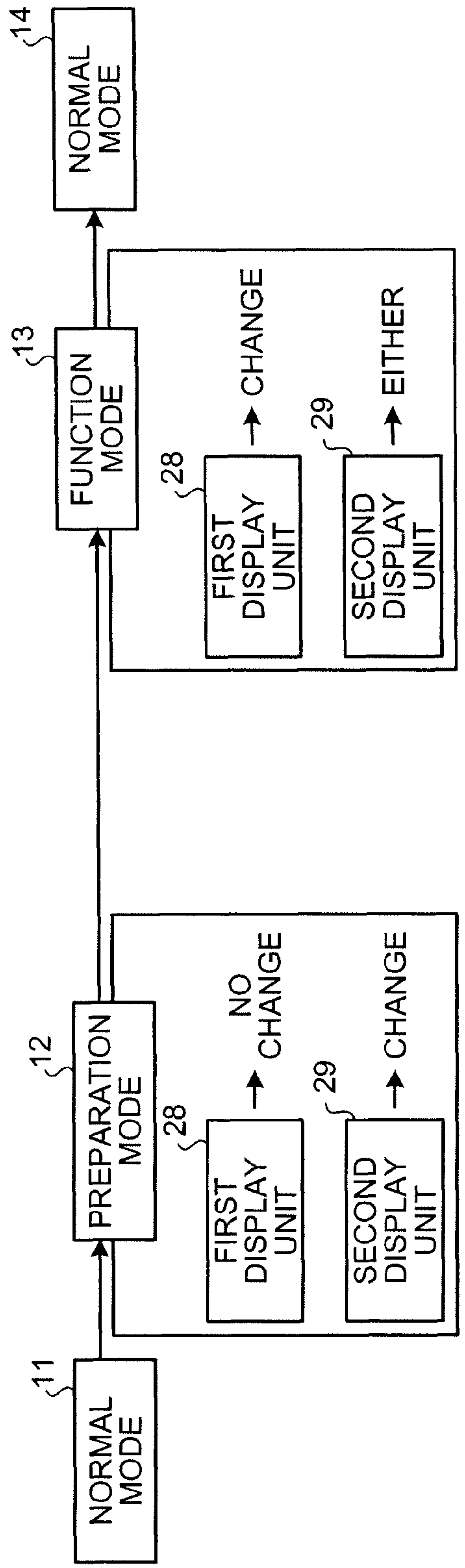
FIG. 1-1 is an explanatory diagram illustrating an outline of the present invention.

20 Control unit
21 Input unit
22 Time measuring unit
23 Function measuring unit
24 Mode-transition-condition detecting unit
25 Mode-transition control unit
26 Display driving unit
27*a*, 27*b* Driver
28 First display unit
29 Second display unit
100 Main unit (of an electronic device)
102 (102*a*, 102*b*, 102*c*, 102*d*) Operation button
103 Second hand
104 Minute hand
105 Hour hand
106 Function hand
107 Digital display unit
200 Microcomputer IC
201 RAM
202 ROM
203 Motor driving circuit
206 Liquid-crystal driving circuit
207 Solar cell
208 Secondary battery
209 Charge control circuit
210 Switch unit
212 Pressure sensor
214 Water sensor
215 Water-sensor control circuit
216 Alarm (beeper)
218 LED
301 Water detecting unit
302 First-water-depth detecting unit
303 Second-water-depth detecting unit
304 Display control unit
305 Driving control unit
306 Third-water-depth detecting unit
307 Measuring unit
308 Resetting unit

BEST MODE(S) FOR CARRYING OUT THE INVENTION (Outline of the Present Invention)

Figures 1, 2:
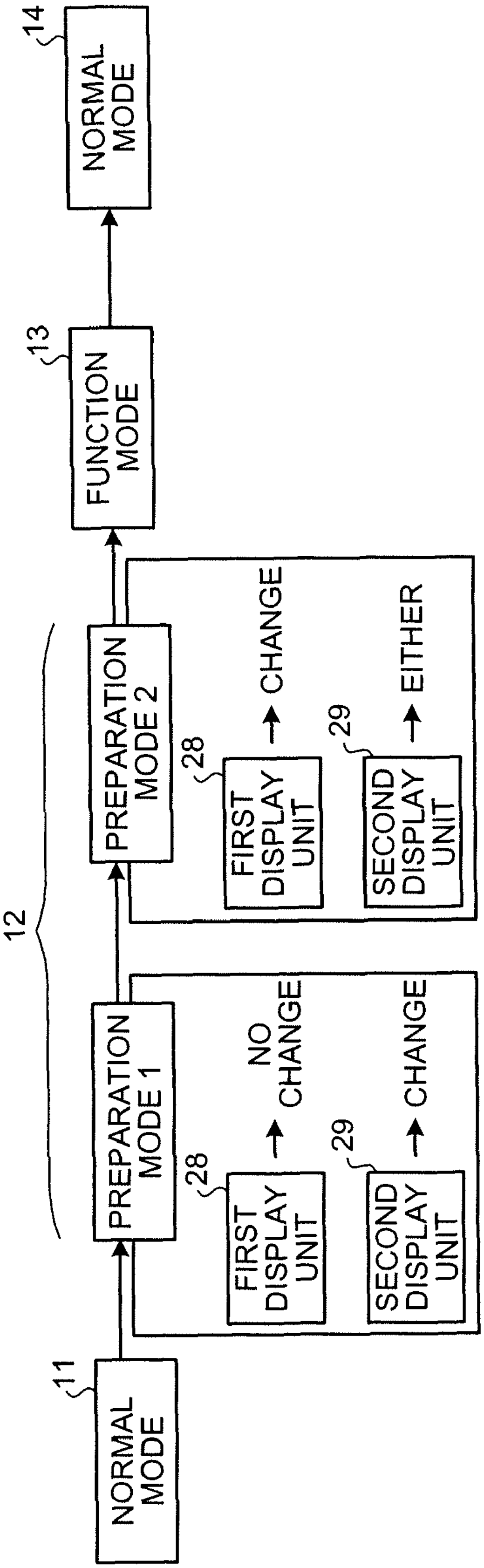
Figure 2:
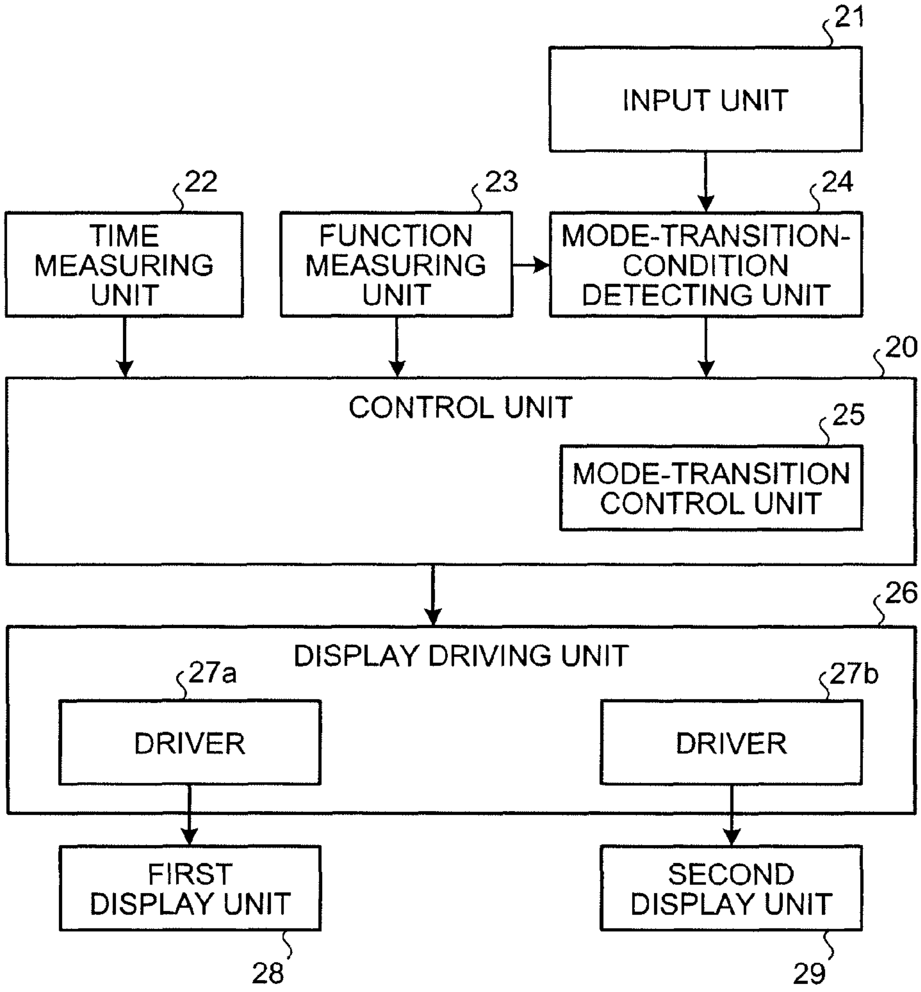

The present invention has a distinguishing aspect in that when modes are changed from a normal mode to a function mode in an electronic device, a display mode of the electronic device is caused to transition from the normal mode to a preparation mode once, and then to the function mode. FIG. 1-1 and FIG. 1-2 are explanatory diagrams showing an outline of the present invention.

An electronic device according to the present invention includes a first display unit 28 and a second display unit 29 that differs from the first display unit 28 in at least the type, a driving method to control a display, and a mode of driving to control a display, and displays a plurality of functions using the first display unit 28 and the second display unit 29. The first display unit 28 is, for example, a display device that has a larger constraint on driving (namely, for example, a slow display changing speed, large power consumption, etc.) compared to the second display unit 29. Specifically, for example, the first display unit 28 corresponds to an analog display in a display made by the combination of a digital display and an analog display. More specifically, the analog display includes a display with, for example, an indicator (at least one of an hour hand, a minute hand, a second hand, a function hand, etc.) and a display with a date plate, a day plate, or a plate indicating other information.

On the other hand, the second display unit 29 is, for example, a display device that has a smaller constraint on driving (namely, for example, a high display changing speed, a small power consumption, etc.) compared to the first display unit 28. Specifically, for example, the second display unit 29 corresponds to a digital display in a display made by the combination of a digital display and an analog display. More specifically, the digital display includes an LCD display.

A normal mode 11 shown in FIG. 1-1 is a mode for measuring the time, and a function mode 13 is a mode for measuring physical quantity to realize a function other than time measurement. Specifically, the normal mode 11 is a mode in which the time and a calendar are displayed. On the other hand, the function mode 13 is a mode in which measurement results, such as measurement by a water depth detector, an altitude detector, and a compass and a chronograph are displayed. At least in the function mode 13, it is desirable to perform the function display with both the first display unit 28 and the second display unit 29 because while the analog display can enlarge the display and is likely to appeal to the intuition of the operator, the digital display has comparatively more display flexibility.

When a request for display in the function mode 13 is made to the electronic device (for example, a watch) that is displaying in the normal mode 11, the mode is changed to the function mode 13 at a predetermined timing (details of this predetermined timing are explained hereinafter) after being changed to a preparation mode 12 first, not directly from the normal mode to the function mode 13. When the function is finished, the mode is returned to the normal mode 14. Although the normal mode 11 and 14 are identical modes, such a notation is applied for the purpose of the following explanation.

In the preparation mode 12, specifically, only the display mode of the second display unit 29 is changed without changing the display mode of the first display unit 28. Therefore, the first display unit 28 is indicated as "no change", and the second display unit 29 is indicated as "change" in the preparation mode 12 shown in FIG. 1-1. The "change" of the second display unit 29 serves as notifier to notify the operator of the transition to the function mode 13. When the mode is transitioned to the function mode 13, the display mode of the first display unit 28 is changed. Therefore, the first display unit 28 in the function mode 13 is indicated as "change" shown in FIG. 1-1.

At the transition to the function mode 13, the display mode of the second display unit 29 can be changed or left unchanged. Specifically, if the display contents that are displayed by the second display unit 29 at the time of transition to the preparation mode 12 are the display contents of the function mode 13, it is not necessary to change the display contents at the time of transition to the function mode 13. On the other hand, if the display contents that are displayed by the second display unit 29 are special display contents for the preparation mode 12, the display contents are changed to the display contents of the function mode 13. Therefore, the second display unit 29 in the function mode 13 is indicated as "either" shown in FIG. 1-1.

Moreover, the preparation mode 12 can be constituted by two preparation modes, including a "preparation mode 1" and a "preparation mode 2" as shown in FIG. 1-2. In the "preparation mode 1", specifically, only the display mode of the second display unit 29 is changed without changing the display mode of the first display unit 28. Therefore, the first display unit 28 is indicated as "not change" and the second display unit 29 is indicated as "change" in the "preparation mode 2" shown in FIG. 1-2. With this arrangement, the "preparation mode 1" serves as a notifier to notify the operator of the transition to the function mode 13, similar to the preparation mode 12 shown in FIG. 1-1.

Subsequently, transitioned from the "preparation mode 1" to the "preparation mode 2" occurs at a predetermined timing. In the "preparation mode 2", specifically, the display mode of the second display unit 29 is changed. Therefore, the first display unit 28 is indicated as "change" in the "preparation mode 2" shown in FIG. 1-2. The display contents of the second display unit 29 have already been changed in the "preparation mode 1", and therefore, the display mode can be changed or left unchanged in the "preparation mode 2". By changing the mode, it is possible to notify the operator of the transition to the function mode 13 in stages. Furthermore, at the transition from the "preparation mode 2" to the function mode 13, the display contents of the second display unit 29 can be changed or left unchanged.

Transition from a mode to a next mode is made at the above predetermined timing, specifically, when a later described mode-transition-condition detecting unit 24 shown in FIG. 2 detects a predetermined condition after transition to the mode. The mode transition condition includes, for example, an input of an instruction from the operator, detection of water or a predetermined water depth by a water depth detector, detection of a predetermined altitude by an altitude detector, detection of horizontality by a compass, and the like.

(System Configuration of the Present Invention)

A system configuration of the present invention is explained next. FIG. 2 is an explanatory diagram showing a system configuration of the present invention. As shown in FIG. 2, the electronic device according to the present invention includes a control unit 20, an input unit 21, a time measuring unit 22, a function measuring unit 23, the mode-transition-condition detecting unit 24, a display driving unit 26, the first display unit 28, and the second display unit 29. The control unit 20 controls the entire electronic device, and includes a mode-transition control unit 25. Moreover, the display driving unit 26 includes a driver 27*a* for the first display unit 28 and a driver 27*b* for the second display unit 29.

The input unit 21 receives an input of various kinds of instruction information from the operator, and transmits the received instruction information to the mode-transition-condition detecting unit 24. The input of the various kinds of the instruction information includes a push of a later described operation button 102 shown in FIG. 13. The time measuring unit 22 measures the time and transmits a result of the measurement to the control unit 20. The function measuring unit 23 measures a physical quantity to realize a function other than the time measurement.

Specifically, the function measuring unit 23 can be constituted of, for example, a pressure detecting unit not shown, and a water depth calculating unit that calculates a water depth from pressure data that is detected by the pressure detecting unit, and can be a unit that detects a water depth. More specifically, the function of the function measuring unit 23 can be implemented by a water detecting unit 301, a first-water-depth detecting unit 302, a second-water-depth detecting unit 303, a third-water-depth detecting unit 306, a measuring unit 307, and the like.

Alternatively, the function measuring unit 23 can be constituted of a pressure detecting unit, and an altitude calculating unit that calculates an altitude from the pressure data that is detected by the pressure detecting unit, and can be a unit that measures an altitude. Furthermore, the function measuring unit 23 can be constituted of a magnetism detecting unit and a direction calculating unit that calculates a direction from the magnetism data that is detected by the magnetism detecting unit.

In the mode-transition-condition detecting unit 24, conditions to perform mode transition including a transition condition between the normal mode and the preparation mode, a transition condition between the preparation mode and the function mode, and further, a transition condition from the function mode to the normal mode are registered in advance, and the mode-transition-condition detecting unit 24 determines whether the instruction information from the operator that has been transmitted from the input unit 21 and the result of measurement that has been transmitted by the function measuring unit 23 satisfy the condition. The result of this determination is transmitted to the control unit 20.

The mode-transition control unit 25 determines whether to perform mode transition based on the result transmitted from the mode-transition-condition detecting unit 24. When it is determined to perform the mode transition, the display driving unit 26 is notified accordingly. Specifically, the mode-transition control unit 25 instructs the display driving unit 26 to drive, stop, or hold of each of the display units. The display driving unit 26 accordingly changes the display mode by using the drivers 27*a* and 27*b* that control each of the display units.

Figure 13:
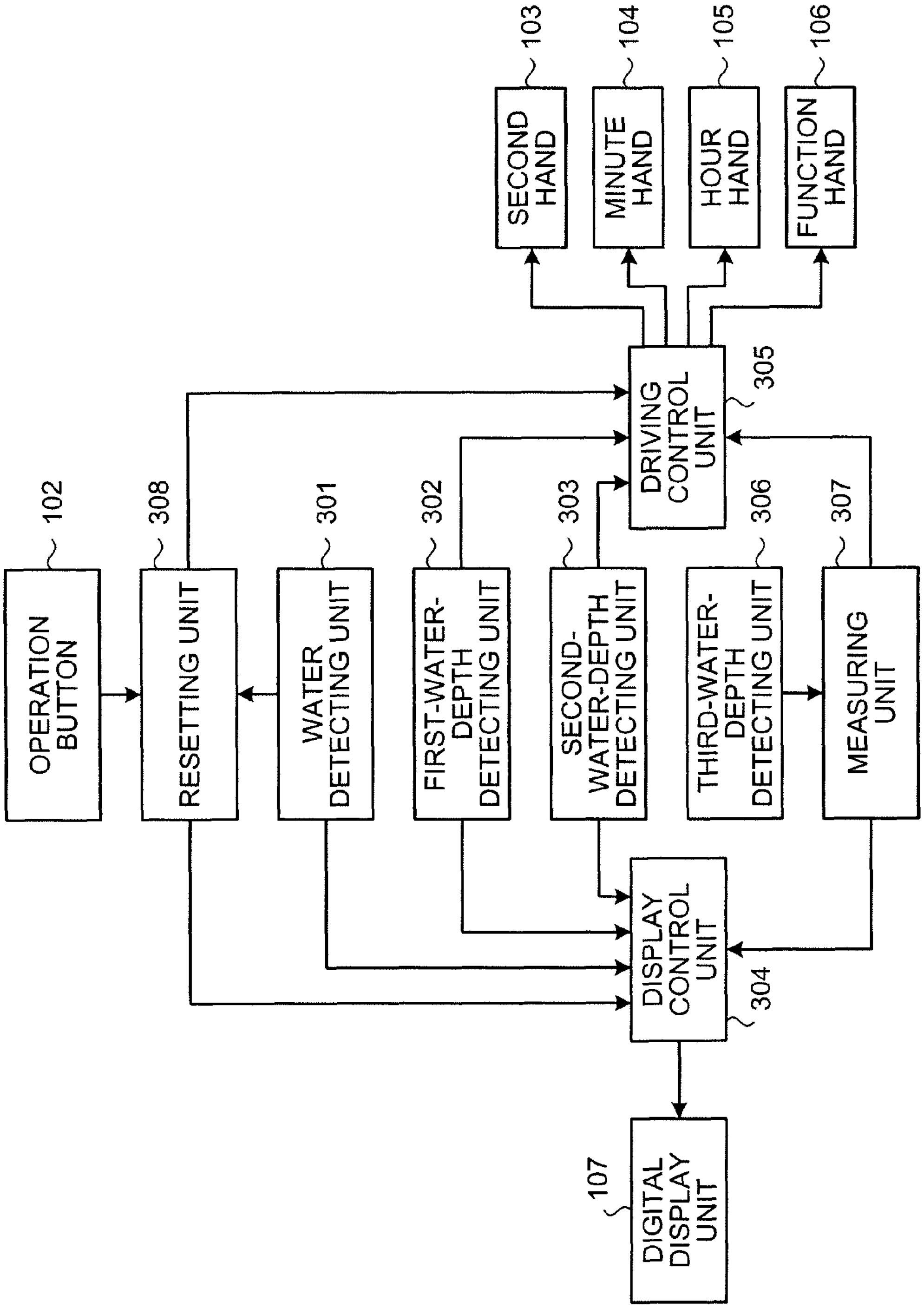
FIG. 13 is an explanatory diagram illustrating the functional configuration of the electronic device according to the present embodiment.

More specifically, the functions of the mode-transition-condition detecting unit 24, the mode-transition control unit 25, and the display driving unit 26 are implemented by a later described display control unit 304 and a driving control unit 305 shown in FIG. 13.

(Display Mode of Water Depth Detector)

Figure 3:
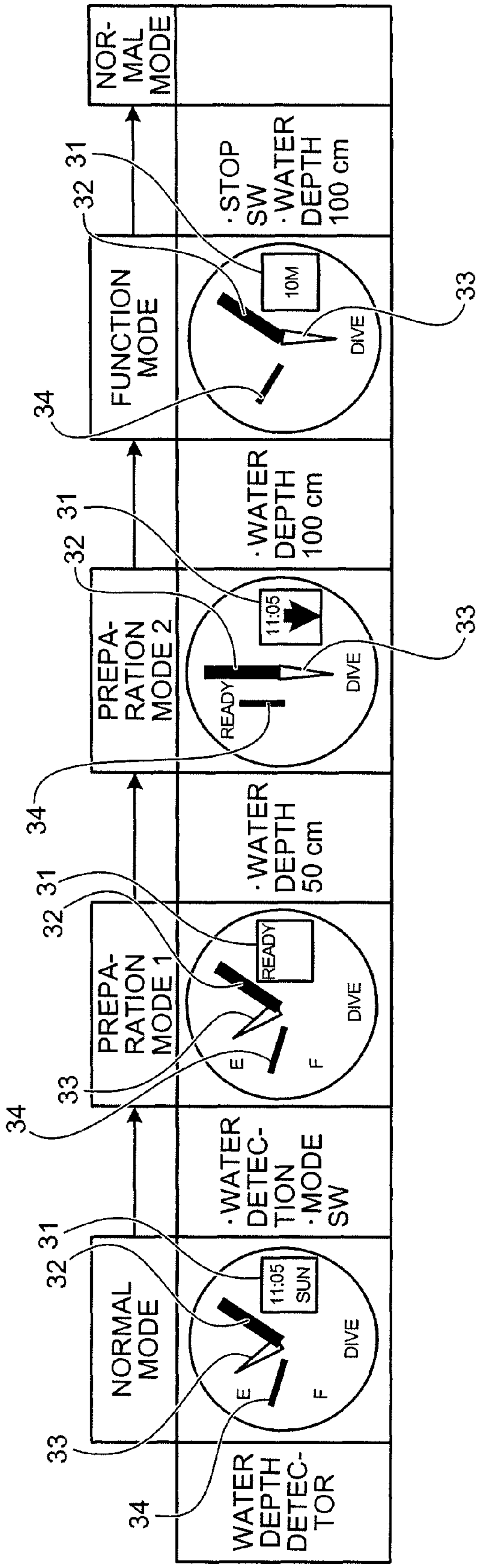
FIG. 3 is an explanatory diagram illustrating a sequence of the display modes in the case of a water depth detector.

A display mode in the case of a water depth detector is explained next. FIG. 3 to FIG. 7 are explanatory diagrams illustrating a sequence of the display modes in the case of a water depth detector. As shown in FIG. 3, the normal mode is the time display mode, and time information, calendar information, and remaining battery level information are displayed. A numeral 31 denotes an LCD as the second display unit 29. On the LCD 31, the current time "11:05" and "SUN" indicating Sunday are displayed.

A numeral 32 denotes a minute hand, a numeral 33 denotes an hour hand, and a numeral 34 denotes a function hand. The minute hand 32 and the hour hand 33 indicate that it is 11:05 in the analog display, and the function hand 34 indicates the remaining level of the battery. The function hand 34 points at approximately the halfway point between empty and the middle. These indicators 32 to 34 correspond to the first display unit 28.

Next, when water is detected (detection of exposure to water) or when a dive mode switch (mode SW) is pushed by the operator, transition from the normal mode to the preparation mode 1 is performed. In the preparation mode 1, the minute hand 32, the hour hand 33, and the function hand 34 are not changed at all from the state in the normal mode, and continue to display the current time and the remaining battery level in the analog display. On the other hand, the LCD 31 erases the display of the current time and the day of the week, and instead, a character of "READY" is displayed that indicates that preparation for a water depth mode is started.

Further, when a water depth of 50 cm (value of the water depth is arbitrarily determined) is detected, transition from the preparation mode 1 to the preparation mode 2 is performed. In the preparation mode 2, the LCD 31 changes the display from the character of "READY" to the current time "11:05" and a downward pointing arrow "↓" indicating a dive. Moreover, the minute hand 32 moves to a position of 12 o'clock and the hour hand 33 moves to a position of 6 o'clock so as to point at a character of "DIVE" (printed on the face in advance). Furthermore, the function hand 34 moves to a position of "READY", that is "0 m" (see FIG. 11), in order to indicate the maximum dive depth.

Next, when a water depth of 100 cm (value of the water depth is arbitrarily determined) is detected, transition from the preparation mode 2 to the function mode is performed. In the function mode, the LCD 31 displays the current depth in the digital display ("10 M"). The minute hand 32 displays dive duration. In the example shown in FIG. 3, the minute hand 32 points at a position of 1 o'clock; therefore, it is possible to intuitively understand that 5 minutes have passed from the start of dive. The hour hand 33 is kept at the position of 6 o'clock pointing the character of "DIVE" to indicate that dive is in progress. By maintaining such a state, it is possible to easily understand that the display is currently in the dive mode. Moreover, the function hand 34 also indicates the current maximum dive depth of "10 M" (see FIG. 11).

Thereafter, when a stop switch for the dive mode is pushed by the operator, or when the water depth again becomes 100 cm, transition from the function mode to the normal mode is performed, and the current time, the day of the week, and the remaining battery level are displayed again.

Figure 4:
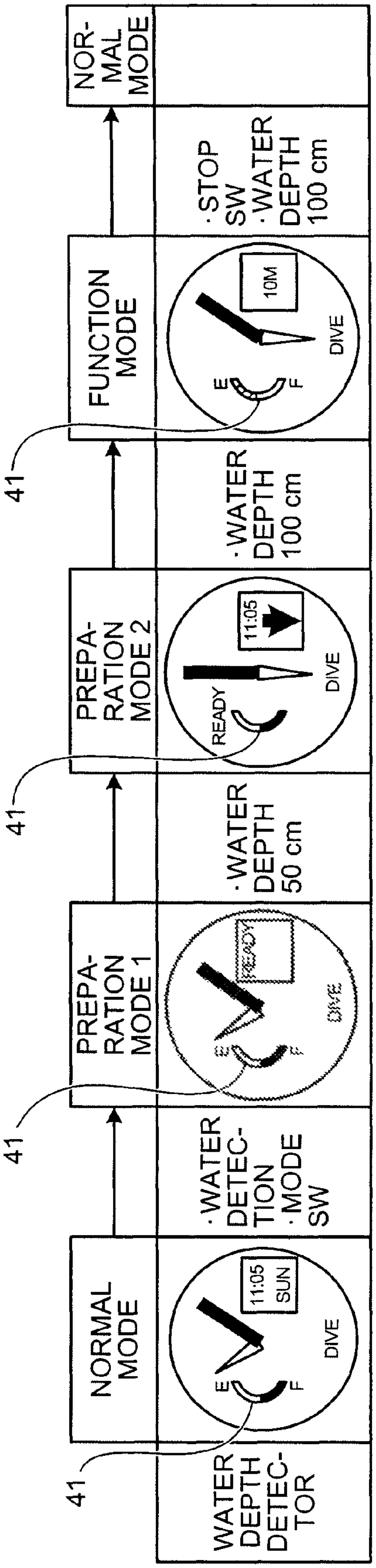
FIG. 4 is an explanatory diagram illustrating another sequence of the display modes in the case of a water depth detector.

In the example shown in FIG. 4, instead of the function hand 34, the maximum dive depth is displayed with a display member 41 in a form of plate in a bar display. The plate-formed display member has, for example, a disc shape, is attached under the face, and rotates clockwise and counterclockwise about a center axis of the face as the center. A window (opening) is provided at a predetermined position on the face, and the contents printed on the plate-formed member can be viewed through the window. In the normal mode, the remaining level of a battery is indicated, and by a colored (for example, in red) portion (a lower portion of the numeral 41 in the normal mode and the preparation mode 1) rotating counterclockwise, the operator intuitively learns of a decrease in the remaining level of the battery. In the example shown in FIG. 4, it can be understood at a glance that the remaining battery level is approximately half.

In the preparation mode 1, the display contents of the plate-formed display member 41 are not changed, and in the preparation mode 2, the plate-formed display member 41 is rotated, for example, counterclockwise, to display once a non-colored portion entirely. Thereafter, in the function mode, when the member 41 is further rotated counterclockwise according to the maximum dive depth, a portion (an upper portion of the plate-formed display member 41 in the function mode) that is colored in another color (for example, in blue) appears, and the maximum dive depth is indicated by the ratio occupied by this colored portion. Since other arrangements are the same as the example shown in FIG. 3, the explanation thereof is omitted.

Figure 5:
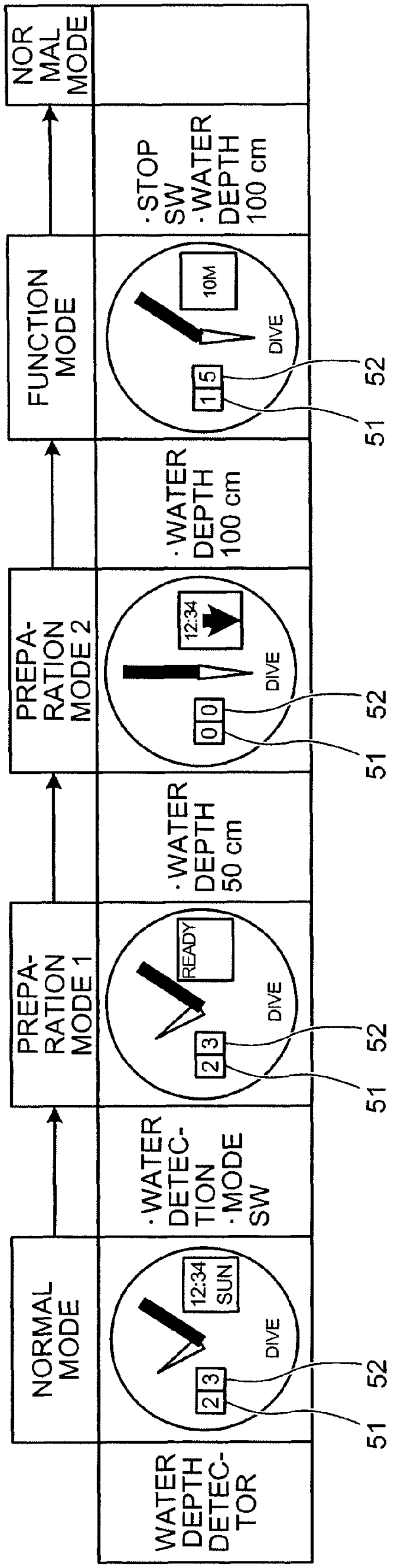
FIG. 5 is an explanatory diagram illustrating another sequence of the display modes in the case of a water depth detector.

In the example shown in FIG. 5, the maximum dive depth is displayed in the digital display using date plates 51 and 52. In the date plates, a numeral 51 indicates a tens place digit and a numeral 52 indicates a ones place digit. This date plate, a so-called "big date", can display each digit independently. In the case of the date plate, although numerals of only 1 to 3 are usually sufficient for the tens place digit 51, it is preferable to print numerals from 0 to 9 to indicate the maximum dive depth.

In the normal mode, since "2" and "3" are displayed, it can be understood that today's date is the "23rd". In the preparation mode 1 also, "2" and "3" are displayed in a similar manner as the normal mode. In the preparation mode 2, the date plates 51 and 52 are changed to "0" and "0", respectively, to indicate that a measurement mode of the maximum dive depth is ready. In the function mode, each of the zeroed numbers of the plates 51 and 52 can be changed corresponding to the maximum dive depth. Usually, it should be arranged to increase the number of the date plate 52 one by one (and since the maximum dive depth is displayed, it is not necessary to decrease the number). In the example shown in FIG. 5, since the date plate 51 indicates "1" and the date plate 52 indicates "5", it can be easily understood that the maximum depth is "15 M". Since other arrangements are the same as the examples shown in FIGS. 3 and 4, the explanation thereof is omitted.

Figure 6:
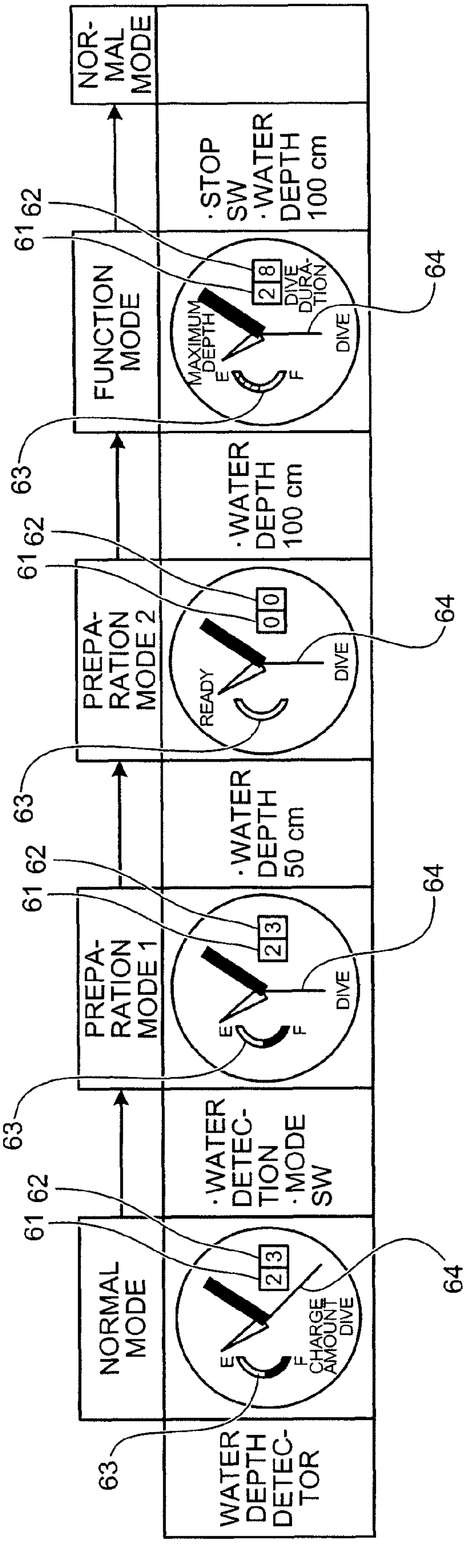
FIG. 6 is an explanatory diagram illustrating another sequence of the display modes in the case of a water depth detector.

FIG. 6 illustrates a case in which the display units are all in analog display. In the example shown in FIG. 6, date plates 61 and 62 and a function display plate 63 are slow in movement, heavy in load, and large in power consumption, compared to a second hand 64. Therefore, these components correspond to the first display unit. On the other hand, the second hand 64 is fast in movement and small in power consumption compared to the date plates 61 and 62 and the function display plate 63; therefore corresponds to the second display unit. As described, even the display units performing the analog display can be either the first display unit or the second display unit.

Furthermore, in the example shown in FIG. 6, since the current time becomes unrecognizable, the time display is not changed. Moreover, the second hand 64 serves also as a mode indicator. Therefore, in the preparation mode 1, the preparation mode 2, and the function mode, the second hand 64 moves to a position of 6 o'clock to point at "DIVE".

In the example shown in FIG. 6, in the normal mode, the date plates 61 and 62 indicate the date (23rd), and the plate-formed display member 63 indicates the remaining battery level similarly to the plate-formed display member 41 shown in FIG. 4. Moreover, the second hand 63 indicates the seconds of the current time. The mode is transitioned to the preparation mode 1. The date plates 61 and 62 are not changed, and only the second hand 64 is moved to the position of 6 o'clock to point at "DIVE".

Next, the mode is transitioned to the preparation mode 2, and the date plates 61 and 62 are changed to "0" and "0", respectively. The plate-formed display member 63 displays a non-colored portion entirely, similarly to the plate-formed display member 41 shown in FIG. 4. When transitioned to the function mode, the date plates 61 and 62 display the dive duration in the digital display. Specifically, the date plate 61 indicates a tens place digit and the date plate 62 indicates a ones place digit. In the example shown in FIG. 6, it can be easily understood that the dive duration is "28 minutes". Since other arrangements are the same as the examples shown in FIG. 4 and FIG. 5, the explanation thereof is omitted.

Figure 7:
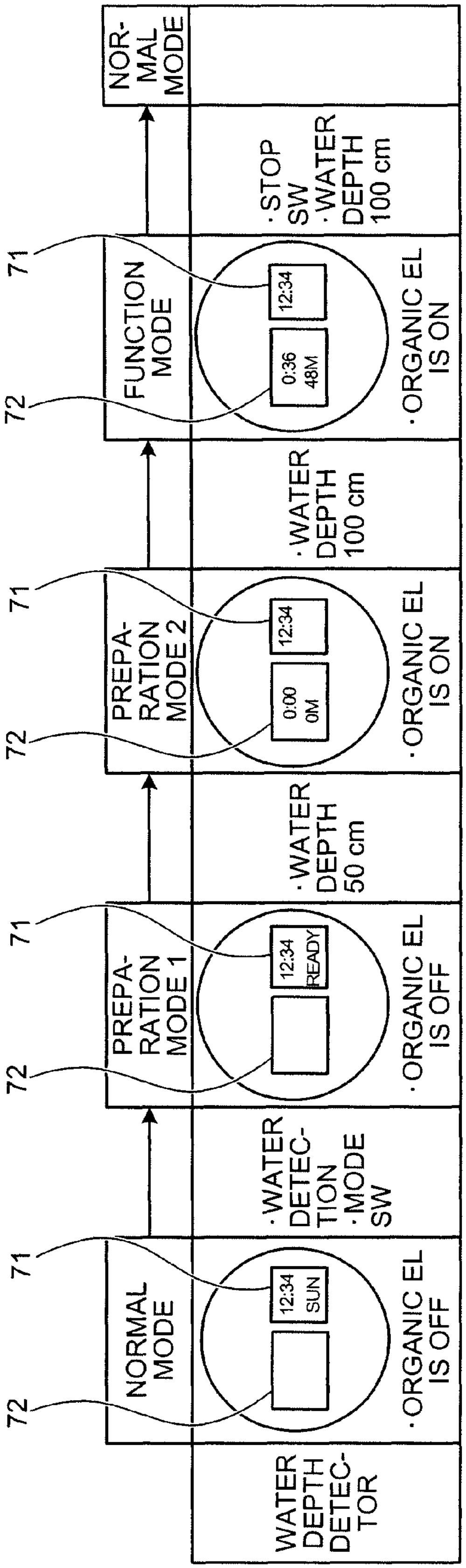
FIG. 7 is an explanatory diagram illustrating another sequence of the display modes in the case of a water depth detector.

FIG. 7 illustrates the case where all display units are in the digital display. As shown in FIG. 7, an organic EL display 72 displays the maximum dive depth, the dive duration, and the like. Although the organic EL display 72 has an advantage in that it can be viewed clearly even in a dark place, since the organic EL display 72 has high brightness, power consumption is large compared to an LCD 71. Therefore, the organic EL display 72 corresponds to the first display unit. On the other hand, the LCD 71 performs other displays, and power consumption is smaller than the organic EL display 72. Therefore, the LCD 71 corresponds to the second display unit. As described, even the display units performing the digital display can be either the first display unit or the second display unit.

In the example shown in FIG. 7, in the normal mode, the LCD 71 displays the current time ("12:34") and the day of the week ("SUN"), similarly to the example shown in FIG. 3. On the other hand, the organic EL display 72 is in an off state, and displays nothing. When transitioned to the preparation mode 1, the organic EL display 72 continues to be in the off state, and displays nothing. The LCD 71 displays "READY", instead of the day "SUN", indicating preparation is in progress for the dive mode.

Subsequently, the mode is transitioned to the preparation mode 2, and the organic EL display 72 is turned on and displays the dive duration ("0:00") and the current water depth ("0 M"). The LCD 71 erases "READY" to notify that the preparation is completed.

Thereafter, in the function mode, the organic EL display 72 is in the on state, and displays the dive duration ("0:36 (36 minutes)") and the current water depth ("48 M"). The following transition to the normal mode is the same as the case shown in FIG. 3, and therefore, explanation is omitted.

(Display Mode of Altitude Detector)

Figure 8:
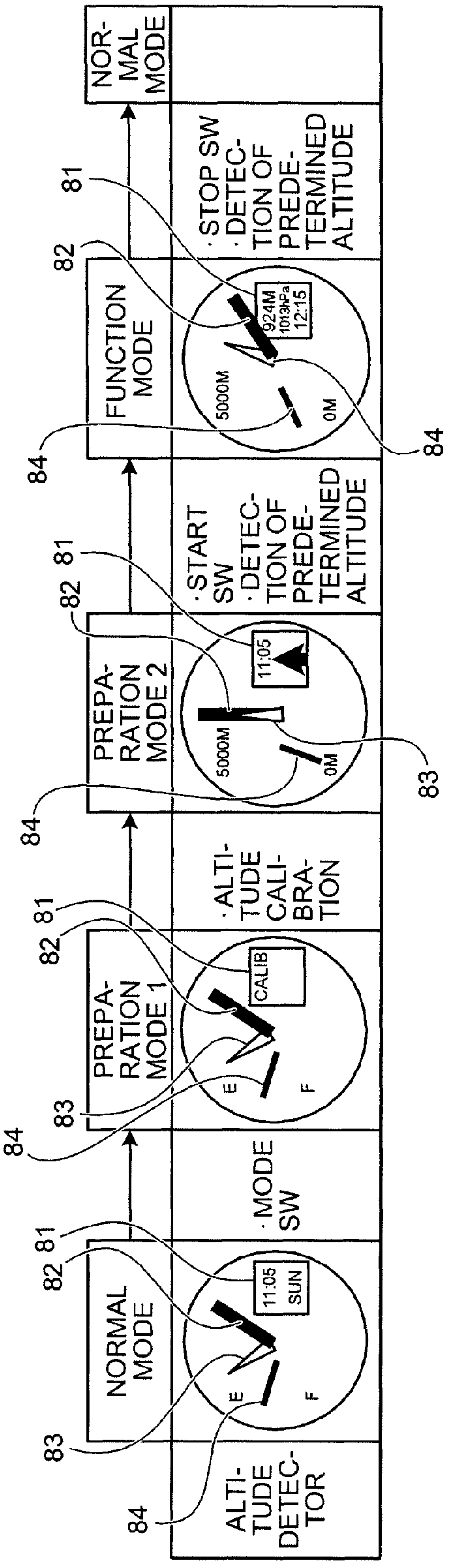
FIG. 8 is an explanatory diagram illustrating a sequence of the display modes in the case of an altitude detector.

A display mode in the case of an altitude detector is explained next. FIG. 8 is an explanatory diagram illustrating a sequence of the display modes in the case of an altitude detector. The first display unit and the second display unit are the same as those illustrated in FIG. 3. As shown in FIG. 8, the normal mode is the time display mode, and time information, calendar information, and remaining battery level information are displayed. A numeral 81 denotes an LCD as the second display unit. On the LCD 81, the current time "11:05" and "SUN" indicating Sunday are displayed.

A numeral 82 denotes a minute hand, a numeral 83 denotes an hour hand, and a numeral 84 denotes a function hand. The minute hand 82 and the hour hand 83 indicate that it is 11:05 in the analog display, and the function hand 84 indicates the remaining level of the battery. The function hand 84 points at approximately the halfway point between empty and the middle. These indicators 82 to 84 correspond to the first display unit.

Next, when an altitude mode switch (mode SW) is pushed by the operator, the mode is transitioned from the normal mode to the preparation mode 1. In the preparation mode 1, the minute hand 82, the hour hand 83, and the function hand 84 are not changed at all from the normal mode, and continue to display the current time and the remaining battery level in the analog display. On the other hand, the LCD 81 erases the display of the current time and the day of the week, and instead, displays "CALIB (CALIBRATION for short)" indicating that the preparation for measurement is started.

Altitude calibration is a function of obtaining data necessary for correction in measurement, for example, when an accurate altitude is available from altitude indication in a sign or the like, by inputting a value thereof to obtain a difference between the value and a measured altitude value. An altitude calibration process is then performed, and when the altitude calibration process is completed, the mode is transitioned from the preparation mode 1 to the preparation mode 2. In the preparation mode 2, the LCD 81 changes the display from the character of "CALIB" to display the current time "11:05" and an upward pointing arrow "↑" indicating altitude increase. Moreover, the minute hand 82 and the hour hand 83 are moved to a position of 12 o'clock, and the function hand 84 is moved counterclockwise to a position of "0 m" to indicate the altitude in the analog display.

Next, when a start SW is pushed by the operator, or when a predetermined altitude (value of the altitude is arbitrarily determined by the operator) is detected, the mode is transitioned from the preparation mode 2 to the function mode. In the function mode, the LCD 81 displays the current altitude ("924 M") in the digital display, and displays a current atmospheric pressure ("1013 hPa") and the current time ("12:15")

in the digital display. The minute hand 81 and the hour hand 82 display an elapsed time since the altitude detector is activated. In the example shown in FIG. 8, the minute hand 81 points at a position of 2 o'clock and the hour hand 82 points at a position of 1 o'clock. Therefore, it can be intuitively understood that the elapsed time is 1 hour and 10 minutes. Furthermore, the function hand 84 also displays the altitude at present in the analog display, and from 5000-M scale, it can be intuitively understood that the altitude is approximately 1000 M.

Thereafter, when the stop SW is pushed by the operator in the similar manner as with the water depth detector shown in FIG. 3, or when a predetermined altitude is detected, the mode is transitioned from the function mode to the normal mode, and the current time, the day of the week, and the remaining battery level are displayed again.

(Display Mode of Compass)

Figure 9:
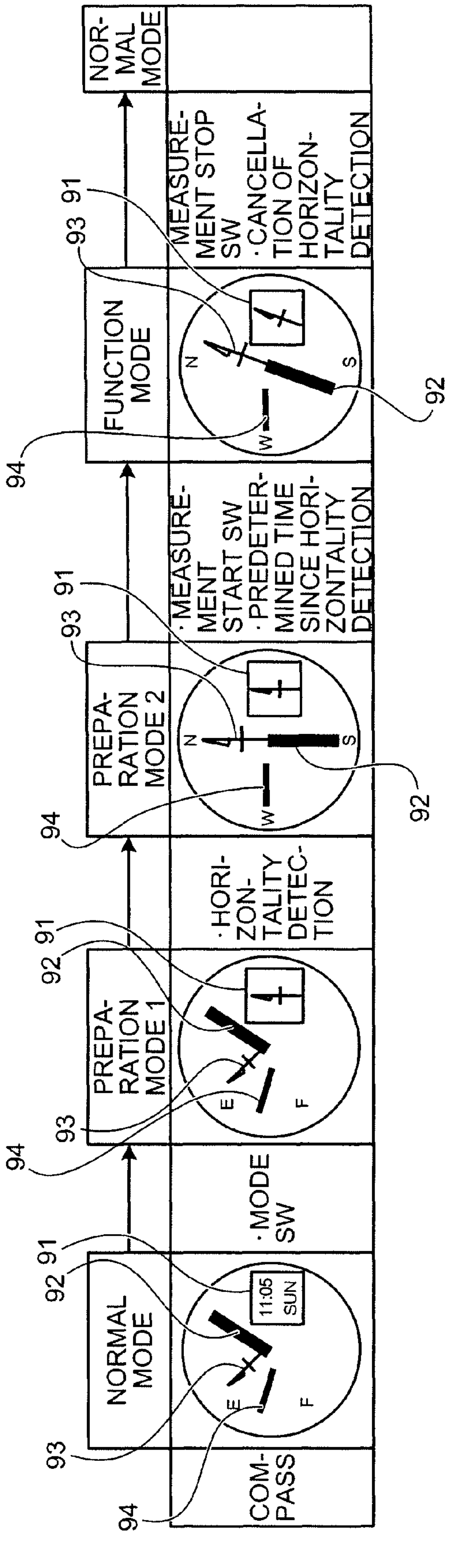
FIG. 9 is an explanatory diagram illustrating a sequence of the display modes in the case of a compass.
Figure 10:
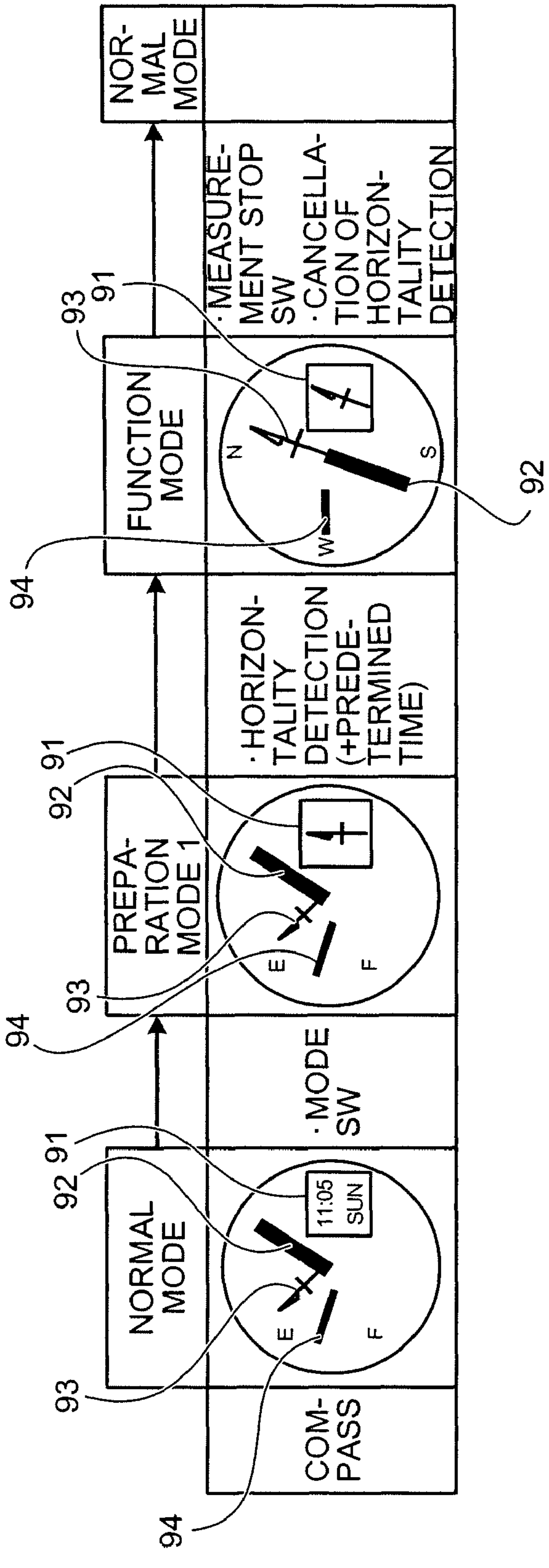
FIG. 10 is an explanatory diagram illustrating another sequence of the display modes in the case of a compass.

A display mode in the case of a compass is explained next. FIG. 9 and FIG. 10 are explanatory diagrams illustrating a sequence of the display modes in the case of a compass. The first display unit and the second display unit are the same as those illustrated in FIGS. 3 and 8. As shown in FIG. 9, the normal mode is the time display mode, and time information, calendar information, and remaining battery level information are displayed. A numeral 91 denotes an LCD as the second display unit. On the LCD 91, the current time "11:05" and "SUN" indicating Sunday are displayed.

A numeral 92 denotes a minute hand, a numeral 93 denotes an hour hand, and a numeral 94 denotes a function hand. The minute hand 92 and the hour hand 93 indicate that it is 11:05 in the analog display, and the function hand 94 indicates the remaining level of the battery. The function hand 94 points at approximately the halfway point between empty and the middle. These indicators 92 to 94 correspond to the first display unit.

Next, when a compass mode switch (mode SW) is pushed by the operator, the mode is transitioned from the normal mode to the preparation mode 1. In the preparation mode 1, the minute hand 92, the hour hand 93, and the function hand 94 are not changed at all from the normal mode, and continue to display the current time and the remaining battery level in the analog display. On the other hand, the LCD 91 erases the display of the current time and the day of the week, and instead, displays, in the 12 o'clock position, the arrow that indicates orientation, thereby indicating that the preparation for measurement is started.

A horizontality detection process is then performed, and when the horizontality detection process is completed, the mode is transitioned from the preparation mode 1 to the preparation mode 2. In the preparation mode 2, the minute hand 92 is moved to a position of 6 o'clock, and the hour hand 93 is moved to a position of 12 o'clock. Thus, the minute hand 92 and the hour hand 93 form a single indicator together. Moreover, the function hand 94 is rotated and kept so as to always point at a position of 9 o'clock. Furthermore, the display of the LCD 91 is not changed.

Next, when a measurement start SW is pushed by the operator, or when a predetermined time has elapsed since horizontality is detected, the mode is transitioned from the preparation mode 2 to the function mode. In the function mode, the LCD 91 displays the direction of magnetic north at present. In the example shown in FIG. 9, since the direction of 1 o'clock is pointed at, and therefore, it can be easily understood that the direction of 1 o'clock is the magnetic north. Since the minute hand 92 and the hour hand 93 form a single indicator, both are moved in the same direction by the same amount. Specifically, the minute hand 92 is rotated from the position of 6 o'clock to a position of 7 o'clock, and together with the rotation, the hour hand 93 is rotated from the position of 12 o'clock to a position of 1 o'clock. With such arrangement, similarly to the display of the LCD 91, it is possible to indicate that the direction of 1 o'clock is the magnetic north.

Thereafter, when the measurement stop SW is pushed by the operator in the similar manner as with the water depth detector shown in FIG. 3 or the altitude detector shown in FIG. 8, or when horizontality detection is cancelled, the mode is transitioned from the function mode to the normal mode, and the current time, the day of the week, and the remaining battery level are displayed again.

While in the example shown in FIG. 9, there are two preparation modes, in the example shown in FIG. 10, there is only one preparation mode. In the example shown in FIG. 10, the normal mode and the preparation mode 1 are the same as the normal mode and the preparation mode 1 shown in FIG. 9. Next, the horizontality detection process is performed, and when the horizontality detection process is completed and a predetermined time elapses, the mode is transitioned from the preparation mode 1 to the function mode, instead of transitioning to the preparation mode 2. Specifically, the LCD 91 displays the direction of the magnetic north at present, and the minute hand 92 and the hour hand 93 also indicate the direction of the magnetic north.

Thereafter, when the measurement stop SW is pushed by the operator similarly to the case shown in FIG. 9, or when the horizontality detection is cancelled, the mode is transitioned from the function mode to the normal mode, and the current time, the day of the week, and the remaining battery level are displayed again. As described, in the case of the compass, the mode can be transitioned directly from the preparation mode 1 to the function mode, omitting the preparation mode 2.

EMBODIMENT

Exemplary embodiments of the electronic device and the display control method according to the present invention are explained in detail below with reference to the accompanying drawings. An example below further specifically explains the above described example shown in FIG. 3.

(External Appearance of Electronic Device)

Figure 11:
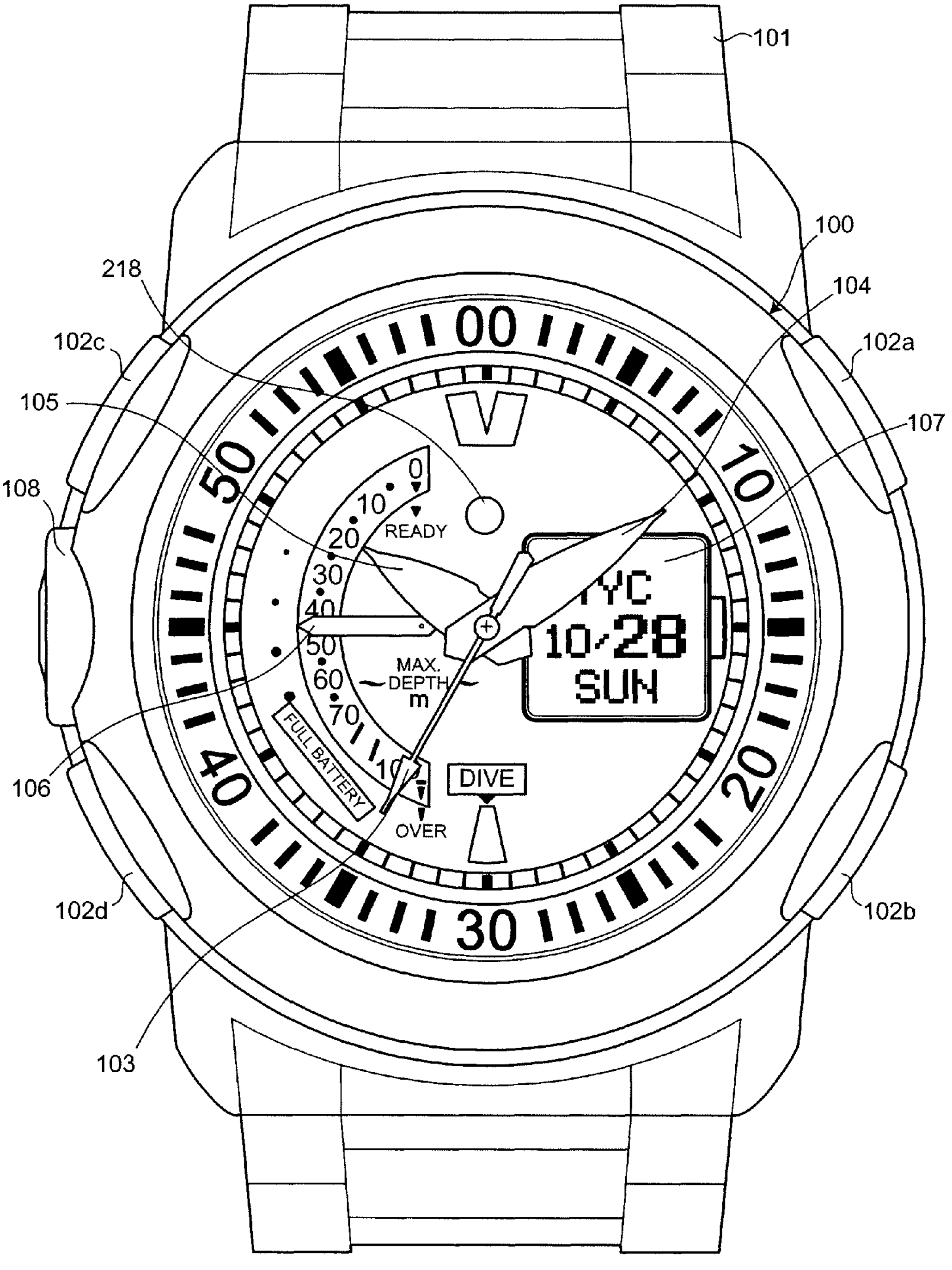
FIG. 11 is an explanatory diagram illustrating an external appearance of an electronic device according to a present embodiment of the present invention.

FIG. 11 is an explanatory diagram illustrating an external appearance of an electronic device according to a present embodiment. As shown in FIG. 11, the electronic device is a watch type electronic device that includes a main unit 100 and a band 101 to fasten the main unit 100, for example, to a wrist. In addition, on the periphery of the main unit 100, a plurality of operation buttons 102 (102*a*, 102*b*, 102*c*, and 102*d*) are provided. On a display portion of the main unit 100, a plurality of indicators (a second hand 103, a minute hand 104, an hour hand 105, and a function hand 106) and a digital display unit 107 that electro-optically displays information. Moreover, a numeral 108 denotes a water detector and a pressure sensor described later.

For the display of the main unit 100, there are at least three modes (a time display mode, a preparation mode, and a dive mode). In the time display mode, the second hand 103 rotates in a second cycle, in other words, makes one rotation (circle) in 60 seconds. The minute hand 104 rotates in a minute cycle, in other words, makes one rotation (circle) in 60 minutes. The hour hand 105 rotates in an hour cycle, in other words, makes one rotation (circle) in 12 hours. The time is displayed with these indicators (the second hand 103, the minute hand 104, and the hour hand 105).

On the other hand, when a dive is started, in other words, when the mode is switched from the time display mode to the dive mode, the second hand 103 keeps rotating in the second cycle, thereby enabling easy determination as to whether the main unit 100 of the electronic device is properly operating by viewing the movement of the second hand 103. Particularly after a shock is applied to the main unit 100 of the electronic device during a dive, it is possible to check whether the electronic device 100 is broken based on the movement of the second hand 103.

Furthermore, the minute hand 104 moves at a high speed from a position that indicates the current time to a position of 12 o'clock, and then, starts rotating in the minute cycle. Therefore, during a dive, it is possible to intuitively recognize the dive duration by checking the position of the minute hand 104. The hour hand 105 moves at a high speed from a position that indicates the current time to a position of 6 o'clock, and then stops. At the position of 6 o'clock, "DIVE" is displayed. By the hour hand 105 pointing at this position (see FIG. 22 described later), it is possible to understand with one glance that the current mode is the dive mode.

As described, the indicators include the second hand 103 and indicators other than the second hand 103 (the minute hand 104 and the hour hand 105), and it is possible to switch between the time display mode in which the time is displayed with the second hand 103 and the indicators other than the second hand 103 (the minute hand 104 and the hour hand 105) and another mode in which information other than the time (for example, the dive duration, indication that it is in the dive mode, or the like) is displayed with the indicators other than the second hand 103 (the minute hand 104 and the hour hand 105) while driving the second hand 103 in the second cycle.

Furthermore, the function hand 106 displays information other than the time. Specifically, the function hand 106 displays information concerning a battery voltage in the time display mode, thereby enabling a user to recognize the information about the remaining level of the battery. As for the information regarding the battery voltage, when the function hand 106 rotates counterclockwise to point at a position of around 7 o'clock to 8 o'clock ("FULL BATTERY"), this position indicates that the battery voltage is high. On the other hand, when the function hand 106 rotates clockwise to point at a position around 10 o'clock to 11 o'clock, this position indicates that the battery voltage is low (or zero). Accordingly, since a position of around 9 o'clock is pointed in the example shown in FIG. 11, it can be understood that the battery voltage is at the mid-level.

Moreover, in the dive mode, the function hand 106 displays the maximum dive depth that is reached during the dive, as information other than the time. In this case, when the function hand 106 rotates counterclockwise to point at a position around 7 o'clock to 8 o'clock (approximately 70 m), it is indicated that a deep point has been reached. On the other hand, when the function hand 106 points at a position around 10 o'clock to 11 o'clock, the maximum dive depth reached during the dive is still shallow (10 m). Accordingly, since a position of around 9 o'clock is pointed in the example shown in FIG. 11, it can be understood that the maximum dive depth during this dive is approximately 45 m.

As described, measurement values of a plurality of physical quantities (specifically, for example, the battery voltage and the maximum dive depth) can be switched to be displayed with the indicators (specifically, for example, the function hand 106). The indicator (specifically, for example, the function hand 106) displays the measurement values of physical quantities by rotating clockwise or counterclockwise, and it can be arranged such that small and large of the measurement values of physical quantities are indicated by the same rotation direction. In other words, it can be related such that when the function hand 106 is rotated counterclockwise, it is directed toward a deep direction in the case of the maximum dive depth and it is directed toward a direction of high voltage in the case of the battery voltage. Conversely, it can be related such that when the function hand 106 is rotated clockwise, it is directed toward a shallow direction in the case of the maximum dive depth, and it is directed toward a direction of low voltage, in the case of the battery voltage.

Moreover, the digital display unit 107 is preferable to be provided on a side of a region including 3 o'clock out of regions that are obtained by dividing a face implementing the function as a watch into two by a line connecting a position of 12 o'clock and a position of 6 o'clock. This is because if it is assumed that the device is put usually on the left arm, provision on a right side, which is the side of the region including 3 o'clock out of the regions that are obtained by dividing the face into two by the line connecting the position of 12 o'clock and the position of 6 o'clock makes it possible to prevent the digital display 107 from being covered by a sleeve or the like.

Furthermore, since the minute hand 104 indicates the dive duration by rotating in the minute cycle starting from the position of 12 o'clock, it is preferable to arrange the digital display unit 107 on the right side so that the digital display unit 107 is hidden behind the minute hand 104 at earlier in the dive compared to the case where the digital display unit 107 is provided on the left side. This is because although it is possible to intuitively understand that not much time has passed right after a dive has started, as the dive duration becomes longer, it becomes impossible to accurately grasp the time, and therefore, usually during a dive, the dive duration is generally checked more frequently after 30 minutes have passed since the dive is started than during the first 30 minutes. Accordingly, compared to the case where the digital display unit 107 is hidden behind the minute hand 104 after 30 minutes has passed, it is better for it to be hidden at the relatively earlier time of the first 30 minutes.

Particularly, the digital display unit 107 is preferable to be arranged in the region including the position of 3 o'clock, namely, for example, at a position shown in FIG. 11. This is because the view is obstructed in a vertical direction if the digital display unit 107 is positioned at an upper portion or a lower portion since the display contents of the digital display unit 107 are usually written horizontally. Therefore, when the display contents are provided with a plurality of lines oriented in the horizontal direction of the digital display unit 107, all of the contents can be obstructed at the same time, and even if switching of the display to be described later is performed, it is impossible to not have a part that becomes hidden behind the minute hand 104.

In the example shown in FIG. 11, the digital display unit 107 displays information on a regional information (NYC (=New York)), the current time of which is indicated, date information (10/28 (October 28)), and day of the week information (SUN (=Sunday)). The information displayed on the digital display unit 107 can be an image (including animation) and the like, besides characters and symbols. As shown, the information can be displayed in at least two lines above and below in the display area of the display unit 107. The digital display unit 107 is implemented with, for example, a liquid crystal panel, an organic EL (electroluminescence) panel, or the like.

(Configuration of Electronic Device)

Figure 12:
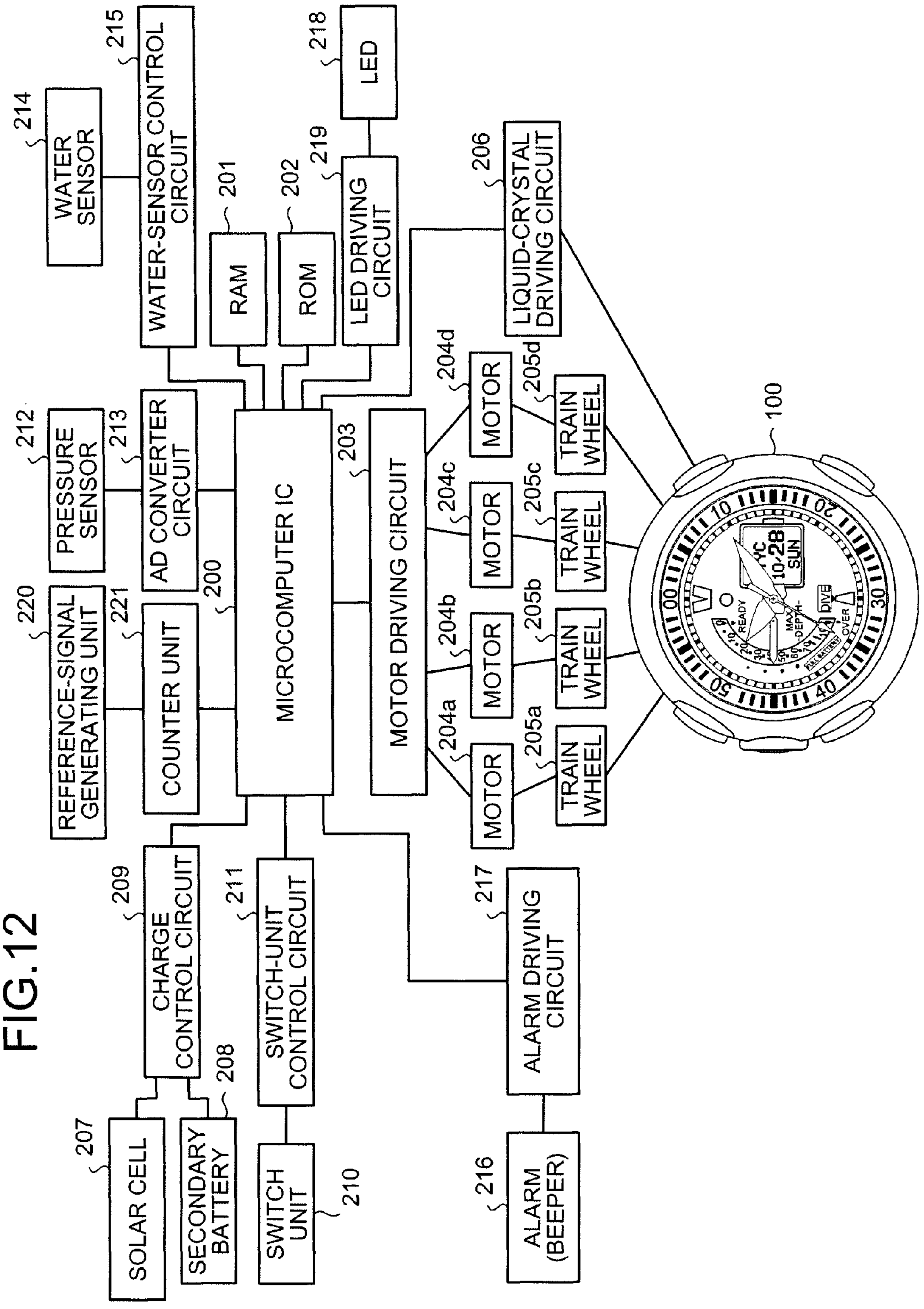
FIG. 12 is an explanatory diagram illustrating a configuration of the electronic device according to the present embodiment.

FIG. 12 is an explanatory diagram illustrating a configuration of the electronic device according to the present embodiment. A shown in FIG. 12, the main unit 100 includes a microcomputer IC 200, a RAM 201, a ROM 202, a motor driving circuit 203, motors 204 (204*a*, 204*b*, 204*c*, and 204*d*), train wheels 205 (205*a*, 205*b*, 205*c*, and 205*d*), a liquid-crystal driving circuit 206, a solar cell 207, a secondary battery 208, a charge control circuit 209, a switch unit 210, a switch-unit control circuit 211, a pressure sensor 212, an AD converter circuit 213, a water sensor 214, a water-sensor control circuit 215, an alarm (beeper) 216, an alarm driving circuit 217, an LED 218, an LED driving circuit 219, a reference-signal generating unit 220, and a counter unit 221.

The microcomputer IC 200 controls a driving state of a timing data storage unit described later, and performs arithmetic control separately on each component. Furthermore, the microcomputer IC 200 controls the entire main unit 100 of the electronic device. The RAM 201 stores various kinds of data. For example, the timing data storage unit, a time-alarm-setting storage unit, a dive-duration-setting storage unit, a warning-water-depth-setting storage unit, a diving/ascending-speed-information storage unit, an abnormal-speed counting unit, a dive-log-data storage unit, and the like are included. The ROM 202 stores various kinds of control programs.

The timing data storage unit included in the RAM 201 stores time information or calendar information that is output from the microcomputer IC 200. Moreover, the timing data storage unit stores timing data (for example, timing of dive duration time, operation prohibited time, etc.) of elapsed time from a predetermined point of time, besides the current time.

The time-alarm-setting storage unit stores information on a set time alarm. The information on the time alarm includes date and time at which alarm sound is output, a type and volume of the alarm sound, duration of the alarm, whether to repeat the alarm, and the like.

The dive-duration-setting storage unit stores information on set dive duration. The information on the dive duration includes time at which a warning alarm is output at the end of the dive duration, in other words, when the set dive duration has passed, a type and volume of the alarm sound, duration of the alarm sound, whether to repeat the alarm, and the like. It can be arranged such that more than one dive duration is set and switched corresponding to a dive condition (equipment type such as a cylinder, a physical condition, etc.).

The warning-water-depth-setting storage unit stores information on a set warning water depth. The information on the warning water depth includes a water depth at which a warning alarm is output, a type and volume of the alarm sound, duration of the alarm sound, whether to repeat the alarm, and the like. It can be arranged such that a different type and volume of the alarm sound are set for each of water depth among a plurality of water depths.

The diving/ascending-speed-information storage unit stores information on a set diving or ascending speed. The information on the diving or ascending speed includes information on a diving or ascending speed (abnormal speed) that should not be exceeded, the frequency of measurement until a warning alarm is output when the abnormal speed is exceeded, a type and volume of the alarm sound, duration of the alarm sound, whether to repeat the alarm sound, and the like.

The abnormal-speed counting unit counts the abnormal speed that is successively measured, and outputs the counted number to the microcomputer IC 200. The microcomputer IC 200 outputs the warning alarm based on the number of measurement that is stored in the diving/ascending-speed-information storage unit and the number of times that is output by the abnormal-speed counting unit.

The dive-log-data storage unit stores a plurality (for example, 20 dives) of pieces of past dive information. When the stored data exceeds 20 dives, data is erased from the oldest dive information and new dive information is stored. The dive information includes dive date, dive duration, the maximum dive depth, average water temperature, and the like.

The motor driving circuit 203 drives the independent four motors 204 (204*a*, 204*b*, 204*c*, and 204*d*), to drive each of the indicators separately through the train wheels 205 (205*a*, 205*b*, 205*c*, and 205*d*).

The liquid-crystal driving circuit 206 drives the digital display unit 107 to display various kinds of information. Furthermore, the charge control circuit 209 converts light that is received by the solar cell 207 into an electric power and accumulates in the secondary battery 208.

The switch unit 210 inputs an operation instruction from the operator, and is the operation button 102 or a winding knob, specifically. The switch-unit control circuit 211 transmits an input regarding the operation instruction from the operator to the microcomputer IC 200 based on a signal from the switch unit 210.

The pressure sensor 212 is constituted of, for example, a semiconductor pressure sensor or the like, and measures water pressure or atmospheric pressure around the main unit 100 of the electronic device. Moreover, the AD converter circuit 213 converts an analog value that is measured by the pressure sensor into a digital value, and transmits to the microcomputer IC 200.

The water sensor 214 detects whether the main unit 100 of the electronic device contacts water. Furthermore, the water-sensor control circuit 215 controls the water sensor 214 to transmit a fact that there is water contact, to the microcomputer IC 200. Thus, the mode switching is automatically performed by the water sensor 214, and therefore, it is not necessary for the operator to perform a switching operation manually when a dive is started or when a dive is finished.

The alarm driving circuit 217 drives a not shown speaker that is mounted on the alarm (beeper) 216 to output an alarm sound (beep). At this time, the alarm driving circuit 217 outputs the alarm sound in different types of sound, different pitches, different volumes, or the like depending on a kind of notice. When more than one person is diving, only with the sound of the alarm 216, it is difficult to tell whose alarm is beeping underwater. Therefore, when the alarm is to be beeped, it is desirable to light the LED 218 together with the alarm 216.

The LED driving circuit 219 drives the LED 218 to light the digital display unit 107 as a backlight or to output a warning light. Instead of the LED 218, an EL (electroluminescence), a lamp, or the like can be employed.

The reference-signal generating unit 220 is constituted of, for example, an oscillation circuit, and generates a signal having a predetermined frequency to be a reference for a timing processing. Moreover, the counter unit 221 outputs the signal having the predetermined frequency generated by the reference-signal generating unit 220 to the microcomputer IC 200.

With such a configuration, the microcomputer IC 200 controls the liquid-crystal driving circuit 206 and changes the display mode of information displayed on the digital display unit 107 according to rotation or a position at which rotation is made of an indicator (specifically, for example, the minute hand 104). As a change of the display mode, for example, it can be displayed by changing a display position of information in a display area of the digital display unit 107.

More specifically, it is desirable to change the display position of the information in the display area of the digital display unit 107 so that the indicator (specifically, for example, the minute hand 104) does not obstruct at least a part of the information, or so that time for which the indicator (specifically, for example, the minute hand 104) obstructs at least a part of the information becomes short compared to a case where the display position is not changed.

Furthermore, the microcomputer IC 200 controls to display a plurality of pieces of information that are respectively displayed in a predetermined display area of the digital display unit 107, and changes the display position of at least one of the pieces of information among the plurality of pieces of information in the display area of the digital display unit 107 based on a priority order set for each of the plurality of pieces of information. The priority order can be determined based on importance of display.

Furthermore, the microcomputer IC 200 controls to display a plurality of pieces of information that are respectively displayed in a predetermined display area of the digital display unit 107, and can switch the display position of at least two of the pieces of information among the plurality of pieces of information in the display area of the digital display unit 107 based on a priority order set for each of the plurality of pieces of information.

At that time, the microcomputer IC 200 changes the display position of the other information in the display area of the digital display unit 107 according to rotation or a position at which rotation is made of an indicator (specifically, for example, the minute hand 104). Furthermore, the display position of the other information in the display area of the digital display unit 107 can be changed so that the indicator (specifically, for example, the minute hand 104) does not obstruct at least a part of the other information, or so that time for which the indicator (specifically, for example, the minute hand 104) obstructs at least a part of the other information becomes short compared to a case where the display position is not changed, according to the rotation or a position at which rotation is made of the indicator (specifically, for example, the minute hand 104).

Furthermore, the microcomputer IC 200 controls to display a plurality of other pieces of information that are respectively displayed in a predetermined display area of the digital display unit 107, and changes the display position of at least one of the pieces of information among the plurality of the other pieces of information in the display area of the digital display unit 107 based on a priority order set for each of the pieces of information among the plurality of other pieces of information.

Out of the information and the other information, information that is obtained by a measuring unit (specifically, for example, the pressure sensor 212, the water sensor 214, or the like) is set to have a higher priority order than information that is obtained by the timing unit (specifically, for example, the reference-signal generating unit 220 and the counter unit 221). Additionally, the microcomputer IC 200 updates the information that is obtained by the measuring unit at a predetermined timing.

The display position of the information in the display area of the digital display unit 107 is changed, according to rotation or a position at which rotation is made of an indicator that obstructs at least a part of the information for a predetermined time or longer among a plurality of indicators, so that the indicator does not obstruct at least a part of the information, or so that time for which the indicator obstructs at least a part of the information becomes short compared to a case where the display position is not changed.

Furthermore, the information displayed on the digital display unit 107 can be switched to different information according to rotation or a position at which rotation is made of an indicator that obstructs at least a part of the information for a predetermined time or longer among a plurality of indicators. The indicator that obstructs at least a part of the information for the predetermined time or longer is an indicator having a longer rotation or a longer rotation cycle than a minute of time.

Moreover, the microcomputer IC 200 drives the alarm driving circuit 217 and the LED driving circuit 219 to output driving pulses to a plurality of warning units (specifically, for example, an alarm device (e.g., the alarm 216) and a light emitting device (e.g., the LED 218)) that operate with the driving pulses, at such timing that the driving pulses of each of the warning units do not overlap with each other.

While an example in which using various kinds of control programs that are stored in the ROM 202, the microcomputer IC 200 performs a predetermined arithmetic processing using data of the RAM 201 that stores various kinds of control information, and controls the driving of each component of the main unit 100 of the electronic device has been described, the present invention is not limited to the configuration of such a specific example, and the same functions can be implemented by a random logic configuration without using the microcomputer IC 200.

(Functional Configuration of Electronic Device in Preparation State and Dive Mode)

Next, a functional configuration of the electronic device according to the present embodiment is explained. FIG. 13 is an explanatory diagram showing the functional configuration of the electronic device according to the present embodiment. As shown in FIG. 13, the main unit 100 of the electronic device includes the water detecting unit 301, the first-water-depth detecting unit 302, the second-water-depth detecting unit 303, the display control unit 304, the driving control unit 305, the third-water-depth detecting unit 306, the measuring unit 307, and a resetting unit 308, in addition to the indicators (the second hand 103, the minute hand 104, the hour hand 105, and the function hand 106) and the digital display unit 107.

The water detecting unit 301 detects water, in other words, detects that a predetermined portion (specifically, a part of the water sensor 214 shown in FIG. 12) of the main unit 100 of the electronic device is wet. Therefore, specifically, the function of the water detecting unit 301 is implemented by, for example, the water sensor 214 and the water-sensor control circuit 215 shown in FIG. 12.

Moreover, the first-water-depth detecting unit 302 detects that a predetermined water depth (hereinafter, "first water depth", and specifically, it is for example, a water depth of 0.5 m (50 cm)) has been reached. The second-water-depth detecting unit 303 detects that a water depth (hereinafter, "second water depth", and specifically, it is for example, a water depth of 1 m (100 cm)) that is deeper than the above first water depth has been reached. Specifically, the functions of the first-water-depth detecting unit 302 and the second-water-depth detecting unit 303 are implemented by, for example, the pressure sensor 212 and the AD converter circuit 213.

The display control unit 304 changes each of the display contents that are displayed on the digital display unit 107 based on a result of detection by the water detecting unit 301, a result of detection by the first-water-depth detecting unit 302, and a result of detection by the second-water-depth detecting unit 303.

Specifically, the display control unit 304 changes the display contents displayed on the digital display unit 107 based on a result of detection (for example, when the water detecting unit 301 gets wet with water) by the water detecting unit 301. Moreover, the display control unit 304 changes the display contents displayed on the digital display unit 107 based on a result of detection (for example, when the main unit 100 of the electronic device reaches the water depth of 0.5 m (50 cm)) by the first-water-depth detecting unit 302.

Furthermore, the display control unit 304 changes the display contents displayed on the digital display unit 107 based on a result of detection (for example, when the main unit 100 of the electronic device reaches the water depth of 1 m (100 cm)) by the second-water-depth detecting unit 303. Specifically, the function of the display control unit 304 is implemented by, for example, the microcomputer IC 200 and the liquid-crystal driving circuit 206.

The driving control unit 305 controls rotation or turn of the indicators (the second hand 103, the minute hand 104, the hour hand 105, and the function hand 106) so as to display the current time or predetermined physical quantity, and moves the above indicators to predetermined positions based on a result of detection by the first-water-depth detecting unit 302 in a preparation state. The above physical quantity is, for example, the dive duration or the maximum dive depth, and values thereof are displayed with the indicators. Specifically, the above predetermined positions are the position of 12 o'clock for the minute hand 104, the position of 6 o'clock for the hour hand, and the position of the maximum dive depth "0" shown in FIG. 11 for the function hand 106.

The driving control unit 305 causes either one of the indicators (specifically, for example, the minute hand 104) to rotate from the predetermined position, namely, the position of 12 o'clock, in synchronization with minutes based on a result of detection by the second-water-depth detecting unit 303. Moreover, the driving control unit 305 causes either one of the indicators (specifically, for example, the function hand 106) to rotate so as to indicate the maximum dive depth, based on a result of detection by the second-water-depth detecting unit 303. Specifically, the function of the driving control unit 305 is implemented by, for example, the microcomputer IC 200 and the motor driving circuit 203.

The third-water-depth detecting unit 306 detects that the third water depth has been reached after the second water depth is reached. Specifically, the third-water-depth detecting unit 306 is a detecting unit to detect that an intended dive is finished and it has ascended again to the water surface. The third water depth can be approximately the same depth as the second water depth, or as the first water depth. The measuring unit 307 starts measuring time based on a result of detection (specifically, for example, when the main unit 100 of the electronic device reaches the water depth of 100 cm) by the third-water-depth detecting unit 306. Specifically, the function of the third-water-depth detecting unit 306 is implemented by, for example, the pressure sensor 212 and the AD converter circuit 213.

At that time, the display control unit 304 determines that the dive is finished when a predetermined time (for example, 10 minutes) that is measured by the measuring unit 307 has passed, and changes the display contents to the display contents before the change that has been made based on the result of detection by the water detecting unit 301. Furthermore, the driving control unit 305 controls rotation or turn of the indicators so as to display the current time when the predetermined time that is measured by the measuring unit 307 has passed. Thus, the dive mode is terminated, and the mode is transitioned to the normal time display mode.

The resetting unit 308, when one or more switches (the operation button 102) are pushed, specifically, when one or more of the operation buttons 102 (102*a* to 102*d*) are pushed, causes the water detecting unit 301 to detect water, and resets (initializes) the entire system of the electronic device based on a result of detection of water (specifically, for example, when the water detecting unit 301 is not wet with water) by the water detecting unit 301. Therefore, when the water detecting unit 301 is wet with water, the reset of the dive mode is not performed.

(Transition from Time Display Mode to Dive Mode)

Figure 14:
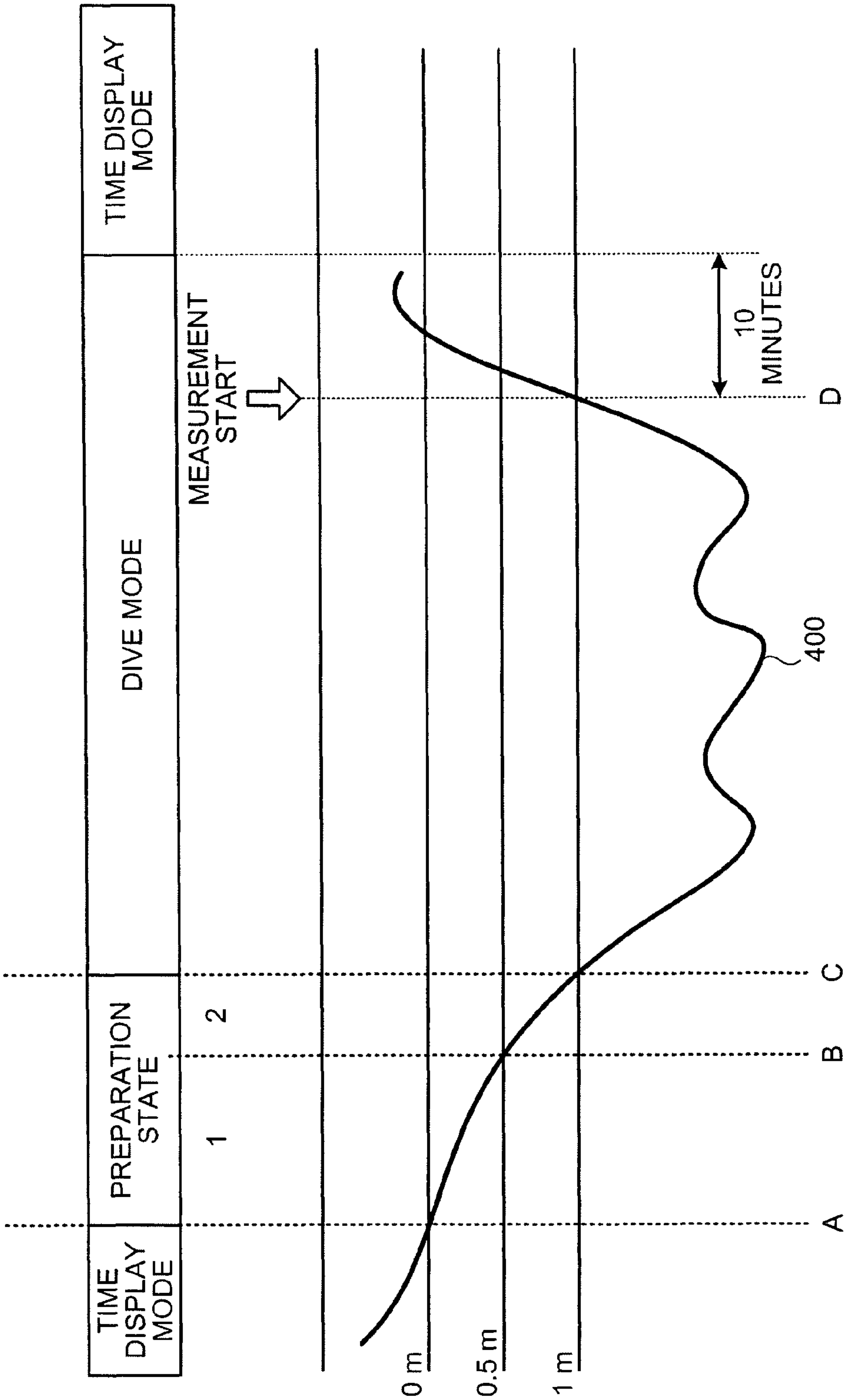
FIG. 14 is an explanatory diagram illustrating relation between a detected water depth and a mode change.

FIG. 14 is an explanatory diagram showing relation between a detected water depth and a mode change. In FIG. 14, a curved line 400 indicates a state of a dive, a vertical axis indicates a water depth, and a horizontal axis indicates dive duration. When a user dives, upon entering water at a point A, which is "0 m" point, the water detecting unit 301 detects a preparation state of a dive. It then becomes a "preparation state 1" of the dive mode. Thereafter, the dive is started, and when a point B, which is a water depth of "0.5 m (50 cm)" is detected, it becomes a "preparation state 2" of the dive mode. Further dived and when a point C, that is a water depth of "1 m (100 cm)" is detected, it becomes the "dive mode".

Thereafter, the dive state is continued in the "dive mode". When a point D that is a water depth of "1 m (100 cm) is again detected as a result of ascendance after the dive is finished, the measuring unit 307 starts measuring. When 10 minutes pass from the start of measurement, it again becomes the normal time display mode. As described, it is possible to automatically switch to an appropriate mode corresponding to the state of a dive of the user.

(Operation of Electronic Device)

Figure 15:
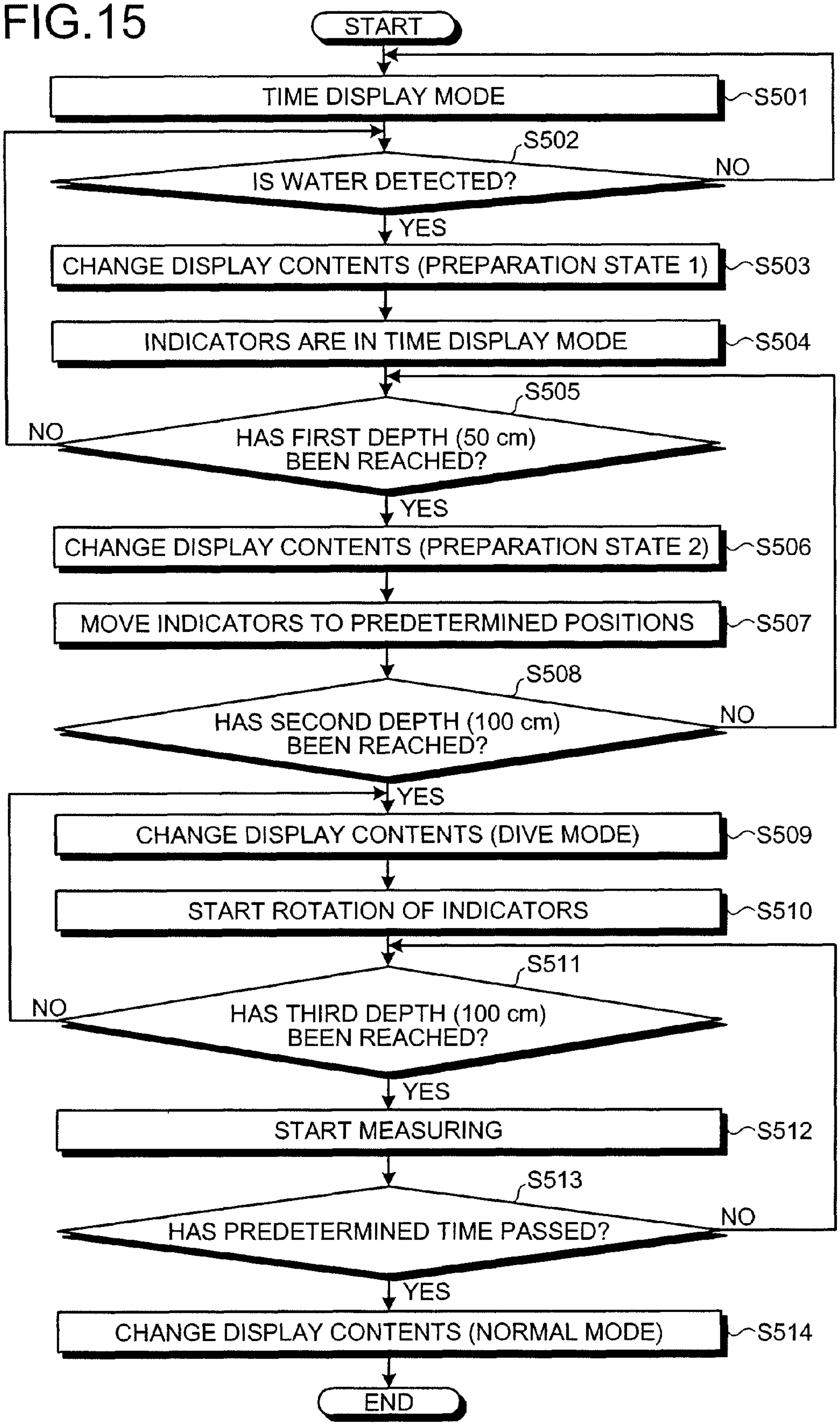
FIG. 15 is a flowchart showing operations of the electronic device according to the present embodiment.
Figure 16:
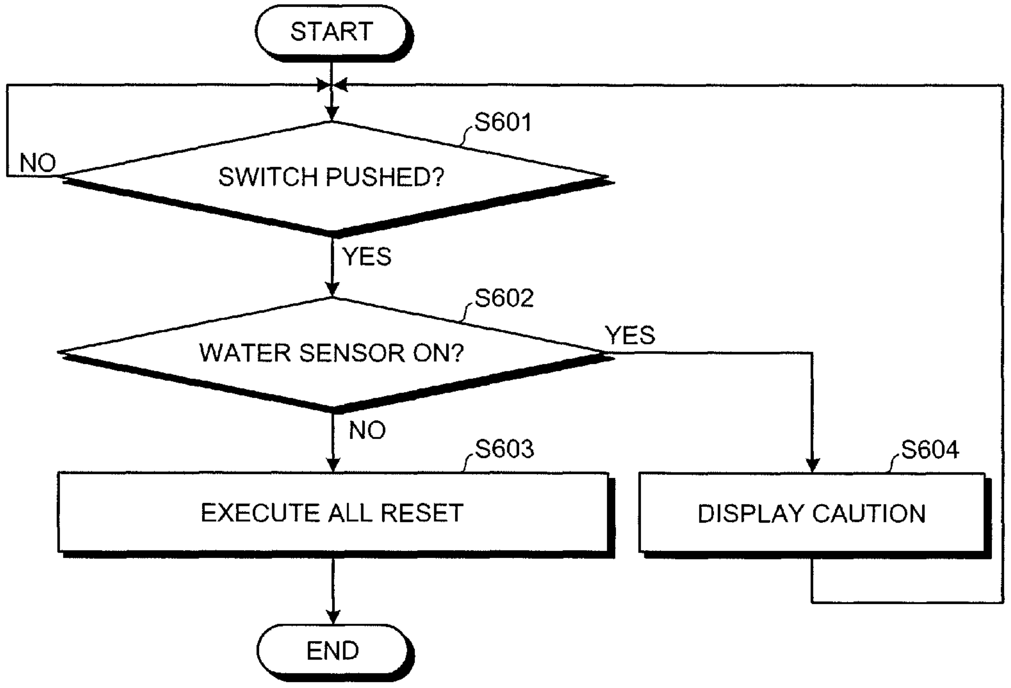
FIG. 16 is a flowchart showing operations of the electronic device according to the present embodiment.

FIG. 15 and FIG. 16 are flowcharts showing operations of the electronic device according to the present embodiment. In the flowchart shown in FIG. 15, first, the main unit 100 of the electronic device is in the normal time display mode (step S501), and determines whether water is detected (step S502). Waiting continues until water is detected, if water is not detected (step S502: NO), the normal time display mode is maintained. If water is detected (step S502: YES), the display contents are changed from the normal time display mode to the "preparation state 1" (step S503). At this time, the indicators continue to be in the time display mode (step S504). The display contents in the normal time display mode and the preparation state 1 are described later (see FIG. 17 to FIG. 20).

Next, while maintaining the "preparation state 1" as the display contents, it is determined whether the first water depth (50 cm) has been reached (step S505). When the first water depth has not been reached (step S505: NO), the process returns to step S502. Waiting continues until the first water depth is reached and when reached (step S505: YES), the display contents are changed from the "preparation state 1" to the "preparation state 2" (step S506), and the indicators are moved to predetermined positions (step S507). The display contents of the preparation state 2 are described later (see FIG. 21 and FIG. 22).

Next, while maintaining the "preparation state 2" as the display contents, it is determined whether the second water depth (100 cm) has been reached (step S508). When the second water depth has not been reached (step S508: NO), the process returns to step S505. Waiting continues until the second water depth is reached and when reached (step S508: YES), the display contents are changed from the "preparation state 2" to the "dive mode" (step S509), and rotation of the indicators starts (indication of minute synchronization and greatest dive depth) (step S510). The display contents of the preparation state 2 are described later (see FIG. 21 and FIG. 22), thereby completing the automatic switch to dive mode. Indication contents of the dive mode are described later (refer to FIG. 22).

Thereafter, upon ascending to near the water surface after the dive is finished, it is determined whether the third water depth (100 cm) has been reached (step S511). Waiting continues until the third water depth is reached and when reached (step S511: YES), the measuring unit 307 starts measuring (step S512). It is then determined whether a predetermined time (for example, 10 minutes) has passed from the start of the measurement (step S513). When the predetermined time has not been passed in a state in which the water depth is less than the third water depth (step S513: NO), the process returns step S511. On the other hand, at step S513, when the predetermined time has been passed in the state in which the water depth is less than the third water depth (step S513: YES), the display contents are changed to the normal time display mode (step S514) and a series of the processes are finished.

Moreover, in the flowchart shown in FIG. 16, it is determined whether a predetermined switch or predetermined switches are pushed at the same time (step S601). Waiting continues until the switch is pushed and when pushed (step S601: YES), it is then determined whether the water sensor 214 is turned ON (step S602).

When the water sensor is ON (step S602: YES), a caution that all reset (in other words, initialization of the dive duration, the maximum dive depth, the current depth, etc.) cannot be executed is displayed (step S604), and the process returns to step S601 without executing the all reset. On the other hand, at step S602, when the water sensor 214 is not ON (step S602: NO), the all reset is executed (step S603), and a series of the processes are finished. When the all reset cannot be executed, it is not necessarily required to display the caution at step S604 and the same state can be maintained.

EXAMPLE

Figure 17:
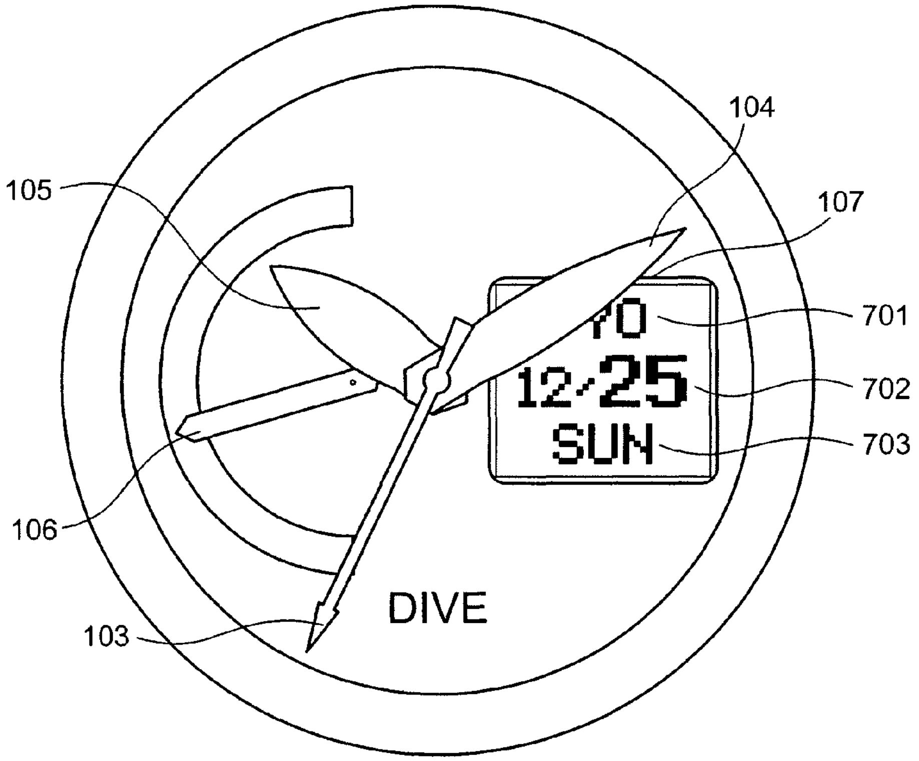
FIG. 17 is an explanatory diagram (Part 1) showing a display control method of the electronic device according to an example of the present invention.

Next, an example is explained. FIG. 17 to FIG. 22 are explanatory diagrams illustrating a display control of an electronic device according to the example of the present invention. FIG. 17 to FIG. 22 respectively illustrate contents of display of the main unit 100 of the electronic device. FIG. 17 illustrates the display contents in the normal time display mode, and in the example shown in FIG. 17, it can be understood that it is 10:09:35 from the positions of the second hand 103, the minute hand 104, and the hour hand 105. Moreover, from the position of the function hand 106, it can be understood that the battery voltage is slightly above the mid-level. In an upper area 701 of the digital display unit 107, regional information of the time that is indicated by the indicators, “TYO” (=Tokyo), is displayed.

Furthermore, in a middle area 702 of the digital display unit 107, date information, “12/25” (=December 25th), is displayed. Date information of “25” is displayed in a larger size than month information of “12”. This enables easy recognition of the date information. In a lower area 703 of the digital display unit 107, day information, “SUN” (=Sunday), is displayed.

Figure 18:
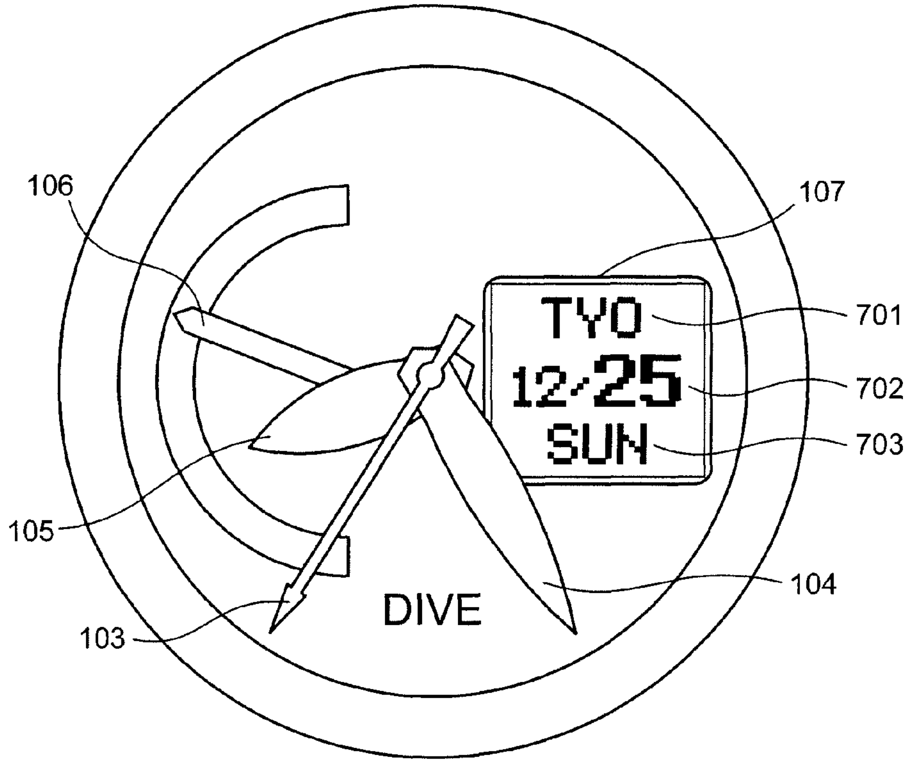
FIG. 18 is an explanatory diagram (Part 2) showing a display control method of the electronic device according to an example of the present invention.
Figure 19:
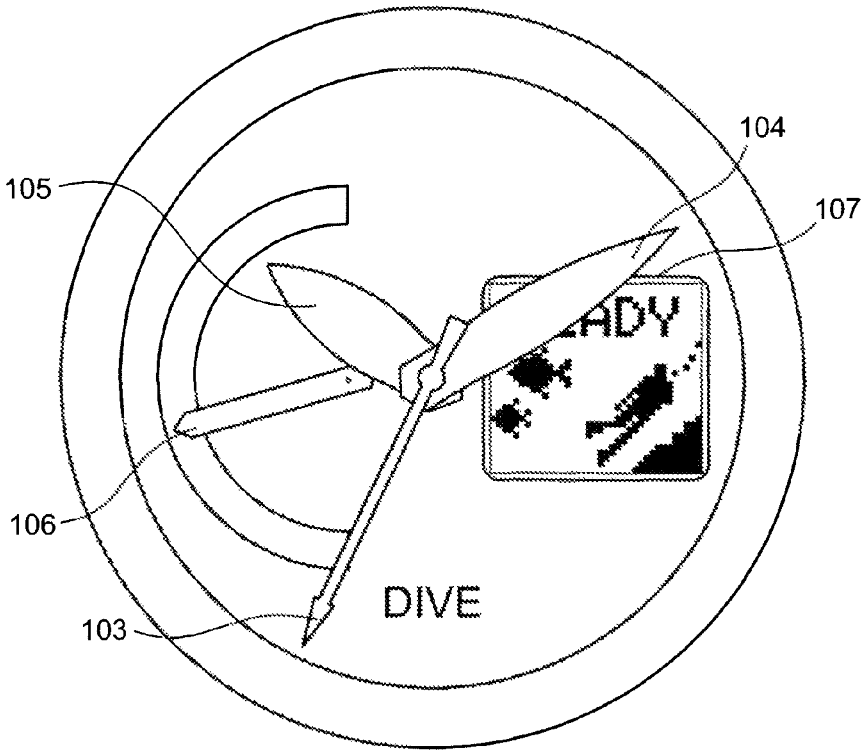
FIG. 19 is an explanatory diagram (Part 3) showing a display control method of the electronic device according to an example of the present invention.
Figure 20:
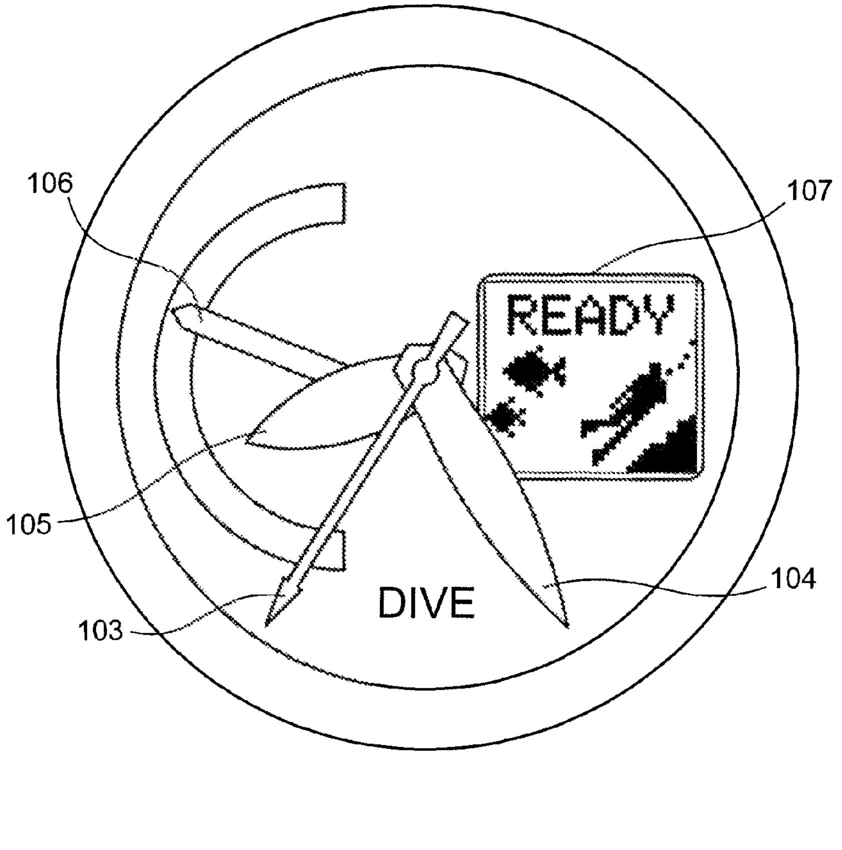
FIG. 20 is an explanatory diagram (Part 4) showing a display control method of the electronic device according to an example of the present invention.
Figure 21:
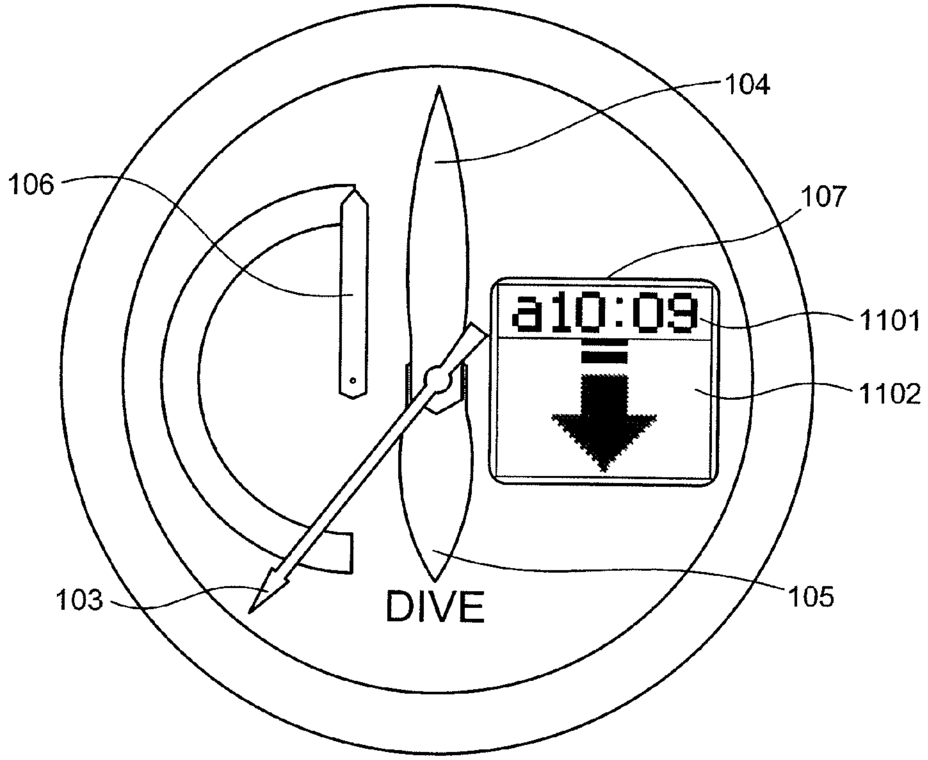
FIG. 21 is an explanatory diagram (Part 5) showing a display control method of the electronic device according to an example of the present invention.
Figure 22:
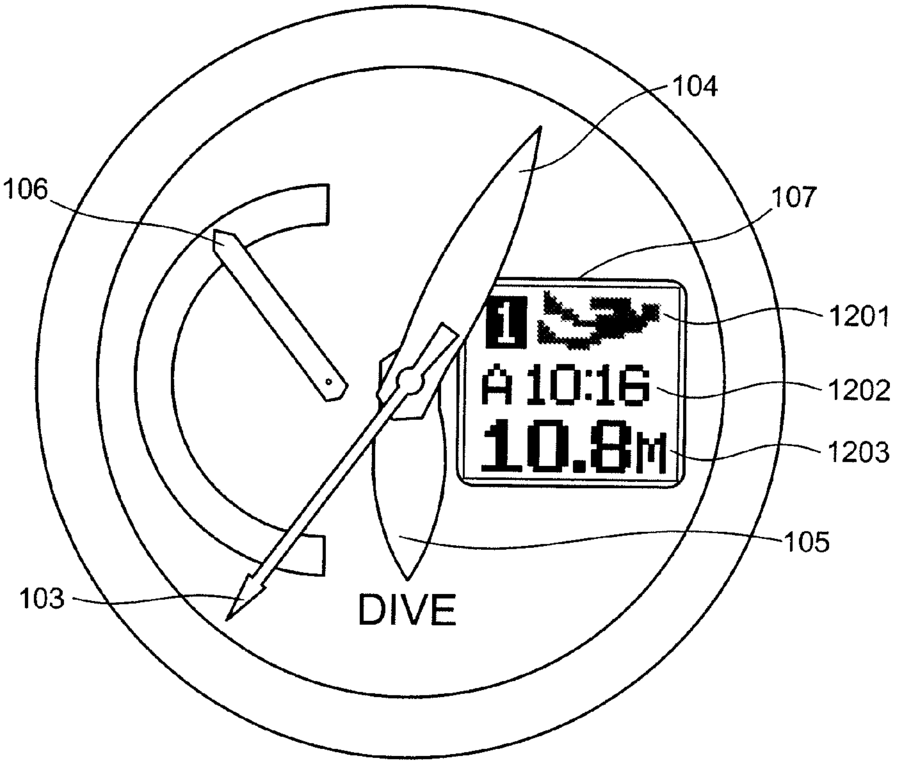
FIG. 22 is an explanatory diagram (Part 6) showing a display control method of the electronic device according to an example of the present invention.

FIG. 18 illustrates the display contents in the normal time display mode similarly to FIG. 17, and the differences between FIG. 17 and FIG. 18 are only the time being displayed and the battery voltage indicated by the function hand 106. Hereafter, FIG. 17 and FIG. 18 are in the normal time display mode, FIG. 19 and FIG. 20 are in a preparation state 1 mode, FIG. 21 is in the preparation mode 2, and FIG. 22 is in the dive mode. Additionally, FIG. 17 and FIG. 19, FIG. 18 and FIG. 20 respectively correspond.

When the water detecting unit 301 detects water, the display contents of the digital display unit 107 are changed to the contents shown in FIG. 19 (or FIG. 20) while the indicators continue to display the normal current time. In the examples shown in FIG. 19 and FIG. 20, a character of “READY” (=during preparation) and an animation that shows an image that a diver is diving are displayed in the digital display unit 107. In this state, it cannot be determined whether it is to be dived or the main unit 100 of the electronic device has gotten wet with water just because a user is washing hands or face. Therefore, only the display screen of the digital display unit 107 is changed and the indicators are maintained in a state indicating the current time.

Next, when it is detected that the main unit 100 of the electronic device has reached the water depth of 50 cm in the state shown in FIG. 19 and FIG. 20, the display contents of the digital display unit 107 are changed from the above character “READY” and animation that illustrates an image of a diver diving to the state of the digital display unit 107 shown in FIG. 21. In the example shown in FIG. 21, information of the current time, “a10:09” (=10:09 a.m.), is displayed in an upper area 1101 of the digital display unit 107. Moreover, in a lower area 1102 of the digital display unit 107, a downward pointing arrow “↓” and animation that indicates that a dive is to be started are displayed.

The second hand 103 continues to rotate in the second cycle without any changes to indicate that the main unit 100 of the electronic device is operating. On the other hand, the minute hand 104 moves to the position of 12 o’clock, and preparation to display the dive duration is performed. The hour hand 105 moves to the position of 6 o’clock to point at “DIVE”, which indicates the dive mode. The function hand 106 rotates clockwise to point at a direction of 12 o’clock. This position indicates the maximum dive depth of “0”, and preparation to indicate the maximum dive depth is performed for the dive. Thus, the current time is not displayed by the indicators, and therefore, the information of the current time “a10:09” is displayed in the upper area 1101 of the digital display unit 107 instead, thereby achieving complementation thereof.

Next, when it is detected that the main unit 100 of the electronic device has reached the water depth of 100 cm in the states shown in FIG. 21, the display contents of the digital display unit 107 are changed from the display contents shown in FIG. 21 to the contents shown in FIG. 22. In the example shown in FIG. 22, the minute hand 104 indicates a state in which 7 minutes have passed since the start of the dive. As shown in FIG. 22, in an upper area 1201 of the digital display unit 107, “1” indicating version 1 of the dive mode and animation (showing a diver that is diving) that indicates the dive mode are displayed. Moreover, in a middle area 1202 of the digital display unit 107, the current time (“A10:16” (=10:16 a.m.) is displayed. In a lower area 1203 of the digital display unit 107, the current depth (“10.8 M” (=10.8 meters)) is displayed. The maximum dive depth reached during this dive is indicated by the function hand 106.

As described above, according to the present embodiment, the indicators 103 to 106 that rotate or turn, and the digital display unit 107 that electro-optically displays information such as characters and symbols are included, and the display control unit 304 that changes the display contents displayed on the digital display unit 107, the water detecting unit 301 that detects water, the first-water-depth detecting unit 302 that detects that the first water depth is reached, and the second-water-depth detecting unit 303 that detects that the second water depth that is deeper than the first water depth is reached are included, and the display control unit 304 respectively changes the display contents displayed on the digital display unit 107 based on a result of detection by the water detecting unit 301, a result of detection by the first-water-depth detecting unit 302, and a result of detection by the second-water-depth detecting unit 303. Furthermore, the driving control unit 305 controls rotation or turn of the indicators 103 to 106 so as to display the current time or predetermined physical quantity, and moves the indicator 103 to 106 to predetermined positions based on a result of the detection by the first-water-depth detecting unit 302. Therefore, automatic switching between the normal time display mode and the dive mode can be smoothly and surely performed.

In the above embodiment, a case of an electronic device has been explained. This electronic device is particularly effective when it is a watch. Moreover, the present invention is not limited to the electronic device, and can be a mobile information terminal device such as a camera, a digital camera, and a digital video camera that are equipped with the electronic device.

INDUSTRIAL APPLICABILITY

As described, the electronic device and the display control method according to the present invention are effective for various information devices that include a plurality of display units, and particularly, suitable for an electronic device such as a watch and a dive computer that includes a plurality of kinds of display units.

The invention claimed is:

1. An electronic device that includes a first display unit and a second display unit that differs from the first display unit in at least one of a type, a driving method to perform a display control, and a mode of driving to perform the display control, and that displays a plurality of functions using the first display unit and the second display unit, the electronic device comprising:

an acquiring unit that acquires a change request to change a mode of the electronic device from a first display mode in which a first function is displayed to a second display mode in which a second function that is different from the first function is displayed; and a display changing unit that changes from the first display mode to the second display mode, and changes display contents of the first display unit and the second display unit, based on the change request that is acquired by the acquiring unit, wherein the display changing unit changes, when the change request is made, the mode of the electronic device to a preparation mode in which only the display contents of the second display unit are changed to a display to inform transition to the second display mode without changing display contents of the first display unit on which the first function is displayed, and thereafter changes the display contents of the first display unit.

2. The electronic device according to claim 1, wherein the display changing unit changes, when the change request is made, the mode of the electronic device to a first preparation mode in which only the display contents of the second display unit are changed to a display to inform transition to the second display mode without changing the display contents of the first display unit on which the first function is displayed, thereafter, changes the display contents of the first display unit, and thereafter, further changes the display contents of the second display unit.

3. The electronic device according to claim 1, wherein the display changing unit changes, when the change request is made, the mode of the electronic device to a first preparation mode in which only the display contents of the second display unit are changed to a display to inform transition to the second display mode without changing the display contents of the first display unit on which the first function is displayed, thereafter, further changes the mode to a second preparation mode in which the display is changed to a display to inform transition of the display contents of the first display unit.

4. The electronic device according to claim 1, wherein the acquiring unit is a detecting unit that detects a predetermined condition, and the display changing unit performs switching between the first display mode, the second display mode, the first preparation mode, and the second preparation mode on condition that the predetermined condition is detected by the detecting unit.

5. The electronic device according to claim 4, comprising an external operating member, wherein the detecting unit is a detecting unit for an operation of the external operating member.

6. The electronic device according to claim 1, wherein the first display unit is slower in a display changing speed than the second display unit.

7. The electronic device according to claim 1, wherein the first display unit is greater in power consumption than the second display unit.

8. The electronic device according to claim 1, wherein the first display unit is configured with one or a plurality of indicators.

9. The electronic device according to claim 1, wherein the first display unit includes a light emitting device.

10. The electronic device according to claim 1, wherein the first display unit displays a plurality of pieces of information in the second display mode.

11. The electronic device according to claim 1, wherein the second display unit is configured with a liquid crystal display device.

12. The electronic device according to claim 1, wherein the second display unit is configured with one or a plurality of indicators.

13. The electronic device according to claim 1, comprising:

a time measuring unit that measures time; and a function measuring unit that measures physical quantity to realize a function other than time measurement, wherein in the first display mode, a result of measurement by the time measuring unit is displayed, and in the second display mode, a result of measurement by the function measuring unit is displayed.

14. The electronic device according to claim 13, wherein the function measuring unit includes a pressure detecting unit and a water depth calculating unit that calculates a water depth from pressure data that is detected by the pressure detecting unit, and in the second display mode, information on the water depth that is calculated by the water depth calculating unit is displayed.

15. The electronic device according to claim 4, wherein the detecting unit is a water detecting unit that detects water.

16. The electronic device according to claim 4, wherein a function measuring unit includes a pressure detecting unit and a water depth calculating unit that calculates a water depth from pressure data that is detected by the pressure detecting unit, and the detecting unit is a water depth detecting unit that detects a predetermined water depth.

17. The electronic device according to claim 1, comprising a dive-duration measuring unit that measures dive measuring duration, wherein in the second display mode, a result of measurement by the dive-duration measuring unit is displayed.

18. The electronic device according to claim 17, comprising:

a pressure detecting unit; and a water depth calculating unit that calculates a water depth from pressure data that is detected by the pressure detecting unit, wherein a maximum dive depth is displayed with an indicator other than an indicator that displays the result of measurement.

19. The electronic device according to claim 13, wherein the function measuring unit includes a pressure detecting unit and an altitude calculating unit that calculates an altitude from barometric pressure data that is detected by the pressure detecting unit, and in the second display mode, information on the altitude that is calculated by the altitude calculating unit is displayed.

20. The electronic device according to claim 17, wherein the function measuring unit includes a magnetism detecting unit and a direction calculating unit that calculates a direction from magnetism data that is detected by the magnetism detecting unit, and in the second function mode, information on the direction that is calculated by the direction calculating unit is displayed.

21. The electronic device according to claim 4, wherein the detecting unit performs at least one of detection of a predetermined altitude, detection of execution of altitude calibration, and detection of horizontality.

22. A display control method of an electronic device that includes a first display unit and a second display unit that differs from the first display unit in at least one of a type, a driving method to perform a display control, and a mode of driving to perform the display control, and that displays a plurality of functions using the first display unit and the second display unit, the display control method comprising:

an acquiring step of acquiring a change request to change a mode of the electronic device from a first display mode in which a first function is displayed to a second display mode in which a second function that is different from the first function is displayed; and a display changing step of changing from the first display mode to the second display mode, and of changing display contents of the first display unit and the second display unit, based on the change request that is acquired at the acquiring step, wherein the display changing unit changes, when the change request is made, the mode of the electronic device to a preparation mode in which only the display contents of the second display unit are changed to a display to inform transition to the second display mode without changing display contents of the first display unit on which the first function is displayed, and thereafter changing the display contents of the first display unit.

* * * * *